United States Patent
Papasakellariou

(10) Patent No.: US 11,239,939 B2
(45) Date of Patent: Feb. 1, 2022

(54) SCHEDULING IN COMMUNICATION SYSTEMS WITH MULTIPLE SERVICE TYPES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 16/818,655

(22) Filed: Mar. 13, 2020

(65) Prior Publication Data

US 2020/0304230 A1 Sep. 24, 2020

Related U.S. Application Data

(60) Provisional application No. 62/822,231, filed on Mar. 22, 2019, provisional application No. 62/825,121, filed on Mar. 28, 2019.

(51) Int. Cl.
| | |
|---|---|
| *H04L 1/00* | (2006.01) |
| *H04W 72/04* | (2009.01) |
| *H04L 1/16* | (2006.01) |
| *H04L 5/00* | (2006.01) |

(52) U.S. Cl.
CPC .......... *H04L 1/0006* (2013.01); *H04L 1/1614* (2013.01); *H04L 5/0094* (2013.01); *H04W 72/042* (2013.01); *H04W 72/0493* (2013.01)

(58) Field of Classification Search
None
See application file for complete search history.

(56) References Cited

U.S. PATENT DOCUMENTS

| | | | | |
|---|---|---|---|---|
| 10,687,322 B2 * | 6/2020 | Seo | .......................... | H04L 5/00 |
| 10,693,612 B2 * | 6/2020 | Yum | ......................... | H04L 1/16 |
| 10,820,269 B2 * | 10/2020 | Lu | .......................... | H04L 5/0044 |
| 10,849,118 B2 * | 11/2020 | Kim | ....................... | H04W 76/27 |
| 10,945,251 B2 * | 3/2021 | Nogami | .............. | H04W 72/042 |
| 11,102,643 B2 * | 8/2021 | Lin | ................... | H04W 72/1289 |

(Continued)

OTHER PUBLICATIONS

International Search Report and Written Opinion of the International Searching Authority in connection with International Application No. PCT/KR2020/003948 dated Jul. 1, 2020, 10 pages.

(Continued)

*Primary Examiner* — Ayaz R Sheikh
*Assistant Examiner* — Faiyazkhan Ghafoerkhan

(57) ABSTRACT

A method for a user equipment (UE) to receive physical downlink control channels (PDCCHs) with a first sub-carrier spacing (SCS) includes receiving a bitmap indicating symbols of a slot that are first symbols of control resource sets (CORESETs) for PDCCH receptions, determining, based on the bitmap, a first number of symbols that is a smallest number of symbols in between a first symbol of PDCCH receptions in first CORESETs and a first symbol of PDCCH receptions in second CORESETs, determining, based on the first number of symbols and the SCS, a first maximum number of non-overlapping control channel elements (CCEs), and receiving the PDCCHs with the first SCS according to the first maximum number of non-overlapping CCEs.

20 Claims, 10 Drawing Sheets

(56) References Cited

U.S. PATENT DOCUMENTS

| | | | | |
|---|---|---|---|---|
| 2018/0227156 | A1* | 8/2018 | Papasakellariou | H04W 72/0453 |
| 2019/0037569 | A1* | 1/2019 | Lee | H04W 52/48 |
| 2019/0044649 | A1* | 2/2019 | Kim | H04L 5/0053 |
| 2019/0052432 | A1* | 2/2019 | Islam | H04L 5/0053 |
| 2019/0069322 | A1* | 2/2019 | Davydov | H04W 74/006 |
| 2019/0081821 | A1* | 3/2019 | Bendlin | H04L 25/03904 |
| 2019/0082427 | A1* | 3/2019 | Kim | H04W 72/042 |
| 2019/0132109 | A1* | 5/2019 | Zhou | H04L 5/001 |
| 2019/0132824 | A1* | 5/2019 | Jeon | H04L 5/0092 |
| 2019/0132845 | A1* | 5/2019 | Babaei | H04W 72/042 |
| 2019/0132857 | A1* | 5/2019 | Babaei | H04W 72/042 |
| 2019/0149380 | A1* | 5/2019 | Babaei | H04L 5/001 370/330 |
| 2019/0150123 | A1* | 5/2019 | Nogami | H04W 72/14 370/330 |
| 2019/0207662 | A1* | 7/2019 | Zhou | H04W 72/042 |
| 2019/0207737 | A1* | 7/2019 | Babaei | H04W 24/08 |
| 2019/0215048 | A1* | 7/2019 | Cirik | H04B 7/088 |
| 2019/0215712 | A1* | 7/2019 | Babaei | H04W 24/10 |
| 2019/0215820 | A1* | 7/2019 | Cirik | H04W 72/0446 |
| 2019/0215870 | A1* | 7/2019 | Babaei | H04W 74/0833 |
| 2019/0215888 | A1* | 7/2019 | Cirik | H04B 17/318 |
| 2019/0222357 | A1* | 7/2019 | Huang | H04W 72/0446 |
| 2019/0246395 | A1* | 8/2019 | Huang | H04W 72/0446 |
| 2019/0306700 | A1* | 10/2019 | Lin | H04W 76/11 |
| 2019/0306737 | A1* | 10/2019 | Kwak | H04L 5/0053 |
| 2019/0342907 | A1* | 11/2019 | Huang | H04W 72/1289 |
| 2020/0021474 | A1* | 1/2020 | Papasakellariou | H04B 7/0456 |
| 2020/0037245 | A1* | 1/2020 | Lu | H04W 52/0216 |
| 2020/0092855 | A1* | 3/2020 | Seo | H04W 72/042 |
| 2020/0107300 | A1* | 4/2020 | Kwak | H04L 5/0053 |
| 2020/0154295 | A1* | 5/2020 | Lin | H04W 52/0216 |
| 2020/0154467 | A1* | 5/2020 | Gong | H04W 24/08 |
| 2020/0169991 | A1* | 5/2020 | Lin | H04W 72/042 |
| 2020/0196383 | A1* | 6/2020 | Tsai | H04W 80/02 |
| 2020/0228286 | A1* | 7/2020 | Yum | H04L 5/0091 |
| 2020/0229270 | A1* | 7/2020 | Chatterjee | H04W 80/08 |
| 2020/0259896 | A1* | 8/2020 | Sachs | G07C 9/00174 |
| 2020/0267713 | A1* | 8/2020 | Bagheri | H04W 72/1242 |
| 2020/0280474 | A1* | 9/2020 | Babaei | H04W 72/1268 |
| 2020/0322979 | A1* | 10/2020 | Chatterjee | H04W 72/0446 |

OTHER PUBLICATIONS

3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018, 104 pages.

NTT Docomo, Inc., "Offline summary for PDCCH structure and search space," R1-1813933, 3GPP TSG RAN WG1 Meeting #95, Spokane, USA, Nov. 12-16, 2018, 94 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Medium Access Control (MAC) protocol specification (Release 15)", 3GPP TS 38.321 V15.4.0, Dec. 2018, 77 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

* cited by examiner

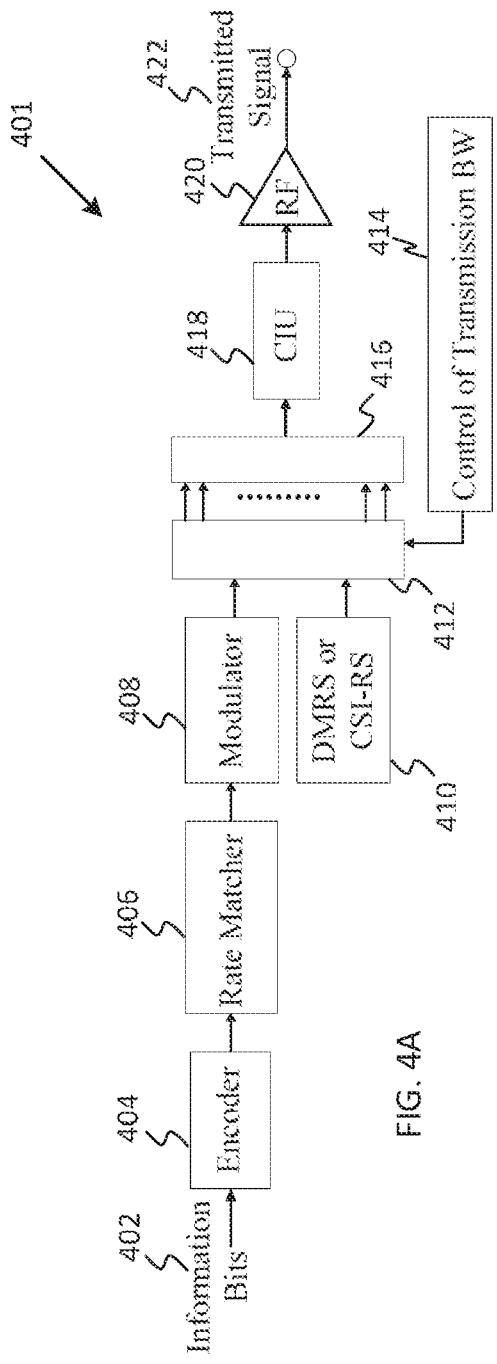
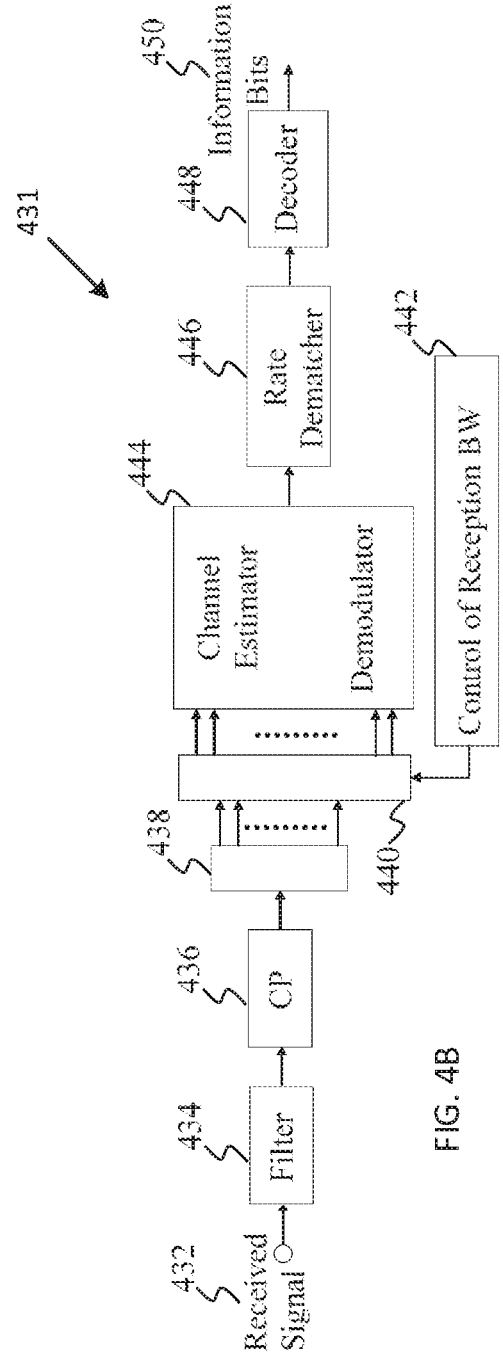
FIG. 4A
FIG. 4B

SCHEDULING IN COMMUNICATION SYSTEMS WITH MULTIPLE SERVICE TYPES

CROSS-REFERENCE TO RELATED APPLICATIONS AND CLAIM OF PRIORITY

This application claims priority to U.S. Provisional Patent Application No. 62/822,231 filed Mar. 22, 2019 and U.S. Provisional Patent Application No. 62/825,121 filed Mar. 28, 2019, the disclosures of which are incorporated herein by reference in their entireties.

TECHNICAL FIELD

The present disclosure relates generally to wireless communication systems. More particularly, the present disclosure relates to scheduling in communication systems that support multiple service/priority types for a same user equipment or for different user equipments.

BACKGROUND

There is a demand for an improved 5G communication system. A 5G communication system can be implemented in higher frequency (mmWave) bands, for example 28 GHz bands or 60 GHz bands, to enable higher data rates or in lower frequency bands, such as below 6 GHz, to enable robust coverage and mobility support. User equipments (UEs) and base station (BSs) operating in 5G systems flexibly support multiple service/priority types associated with different reliability or latency requirements in a same downlink or uplink bandwidth part. 5G communication systems also support different transmission types, with corresponding different requirements for latency and reception reliability, and interference avoidance or compensation can be a critical component in achieving such requirements.

SUMMARY

The present disclosure relates to a method and apparatus for scheduling in communication systems that have multiple service/priority types.

In one embodiment, a method for a user equipment (UE) to receive physical downlink control channels (PDCCHs) with a first sub-carrier spacing (SCS) is provided. The method includes receiving a bitmap indicating symbols of a slot that are first symbols of control resource sets (CORESETs) for PDCCH receptions. The method further comprises determining, based on the bitmap, a first number of symbols that is a smallest number of symbols in between a first symbol of PDCCH receptions in first CORESETs, where the first CORESETs are within a second number of symbols and a first symbol of PDCCH receptions in second CORESETs. The second CORESETs are within the second number of symbols and the first number of symbols is larger than or equal to the second number of symbols. The method further comprises determining, based on the first number of symbols and the first SCS, a first maximum number of non-overlapping control channel elements (CCEs) for PDCCH receptions in CORESETs within the second number of symbols. The CCEs are non-overlapping when the CCEs are in CORESETs with different indexes, or are in CORESETs located in different symbols. The method further comprises receiving the PDCCHs with the first SCS according to the first maximum number of non-overlapping CCEs.

In another embodiment, a user equipment (UE) is provided. The UE includes a receiver and a processor. The receiver is configured to receive a bitmap indicating symbols of a slot that are first symbols of control resource sets (CORESETs) for receptions of physical downlink control channels (PDCCHs) with a first sub-carrier spacing (SCS). The processor is configured to determine, based on the bitmap, a first number of symbols that is a smallest number of symbols in between a first symbol of PDCCH receptions in first CORESETs, where the first CORESETs are within a second number of symbols, and a first symbol of PDCCH receptions in second CORESETs that are within the second number of symbols. The second CORESETs are within the second number of symbols and the first number of symbols is larger than or equal to the second number of symbols. The processor is further configured to determine, based on the first number of symbols and the first SCS, a first maximum number of non-overlapping control channel elements (CCEs) for PDCCH receptions in CORESETs within the second number of symbols. The CCEs are non-overlapping when the CCEs are in CORESETs with different indexes, or are in CORESETs located in different symbols, wherein the receiver is further configured to receive the PDCCHs with the first SCS according to the first maximum number of non-overlapping CCEs.

In yet another embodiment, a base station is provided. The base station includes a transmitter and a processor. The transmitter is configured to transmit a bitmap indicating symbols of a slot that are first symbols of control resource sets (CORESETs) for transmissions of physical downlink control channels (PDCCHs) with a first sub-carrier spacing (SCS). The processor is configured to determine, based on the bitmap, a first number of symbols that is the smallest number of symbols in between a first symbol of PDCCH transmissions in first CORESETs, where the first CORESETs are within a second number of symbols, and a first symbol of PDCCH transmissions in second CORESETs that are within the second number of symbols. The second CORESETs are within the second number of symbols and the first number of symbols is larger than or equal to the second number of symbols. The processor is further configured to determine, based on the first number of symbols and the first SCS, a first maximum number of non-overlapping control channel elements (CCEs) for PDCCH transmissions in CORESETs within the second number of symbols. The CCEs are non-overlapping when the CCEs are in CORESETs with different indexes, or are in CORESETs located in different symbols. The transmitter is further configured to transmit the PDCCHs with the first SCS.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an example transmitter structure according to various embodiments of the present disclosure;

FIG. 4B illustrates an example receiver structure according to various embodiments of the present disclosure;

DETAILED DESCRIPTION

FIGS. 1 through 10, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Figure 1:
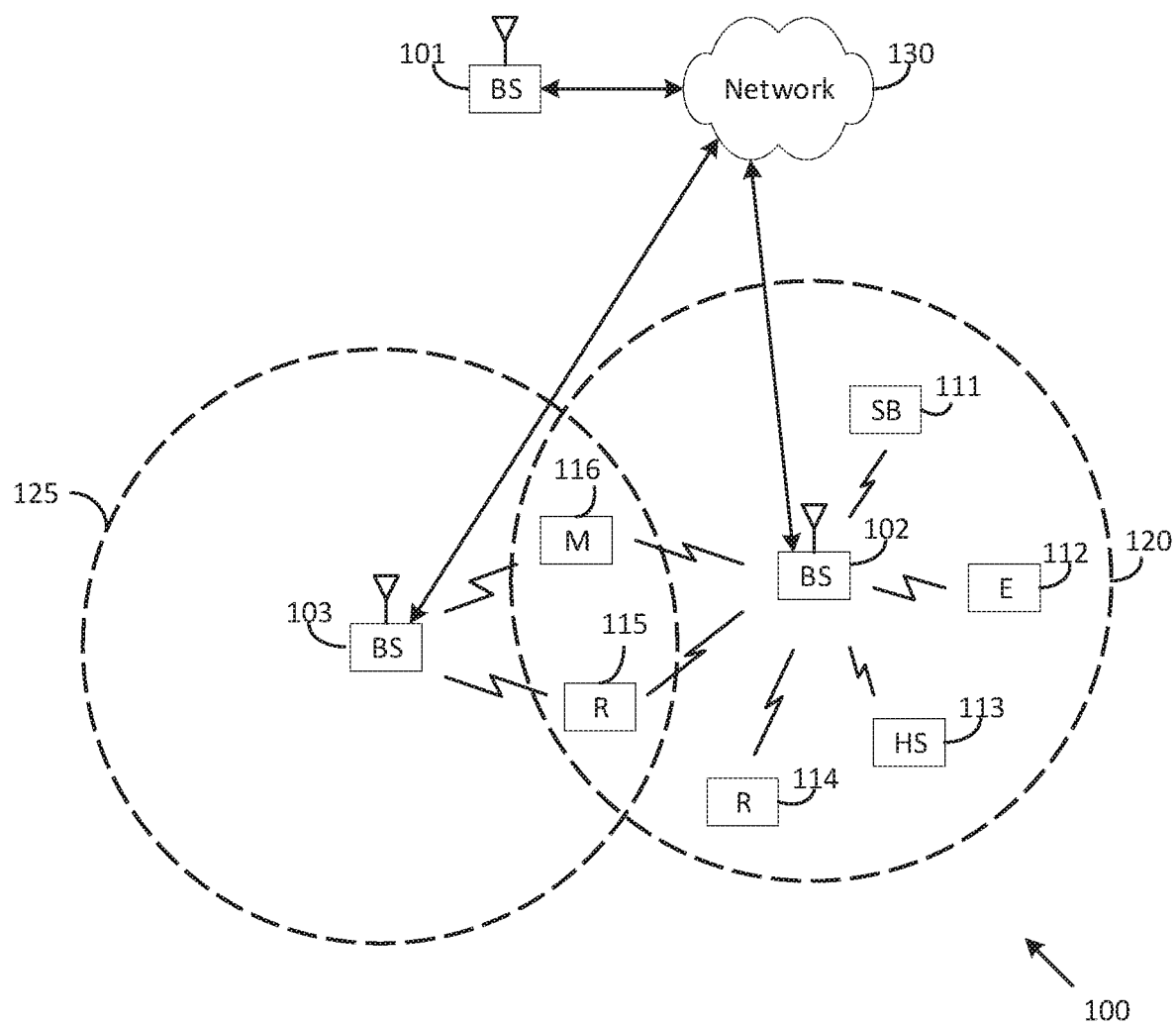
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit scheduling information in a communication system with multiple service/priority type as described in embodiments of the present disclosure. In various embodiments, one or more of UEs 111-116 receive scheduling information in a communication system with multiple service/priority types.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2A:
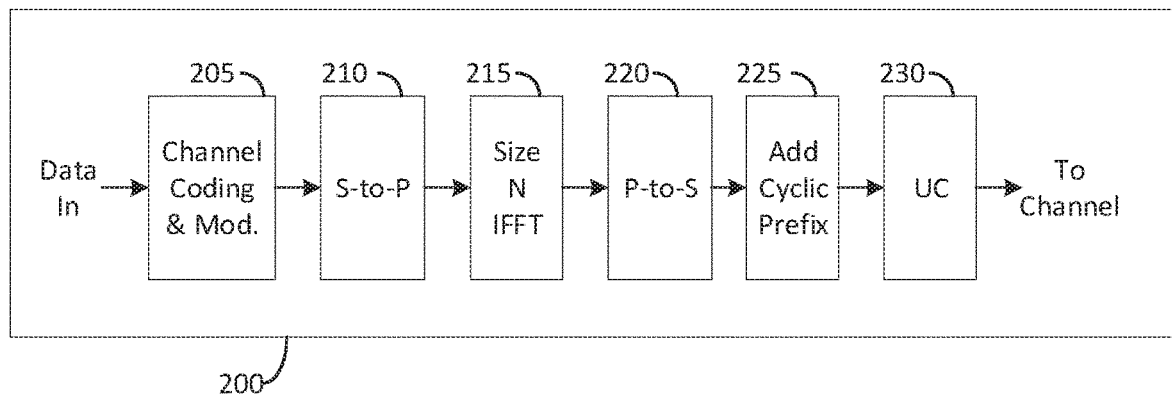
FIGS. 2A and 2B illustrate example wireless transmit and receive paths, respectively, according to various embodiments of the present disclosure.
Figure 2B:
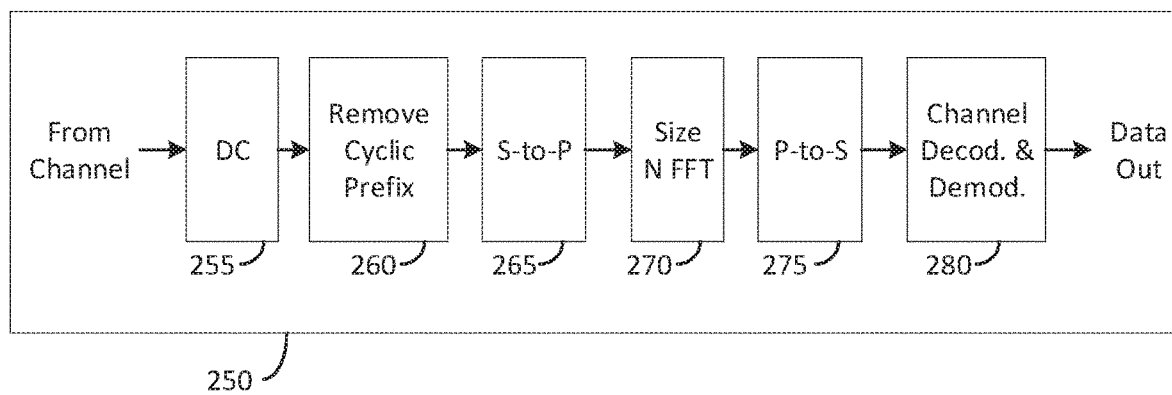

FIGS. 2A and 2B illustrate example wireless transmit and receive paths, respectively, according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB (such as gNB 102) and that the transmit path 200 can be implemented in a UE (such as UE 116). In some embodiments, the receive path 250 is configured to receive scheduling information as described in various embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling scheduling. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
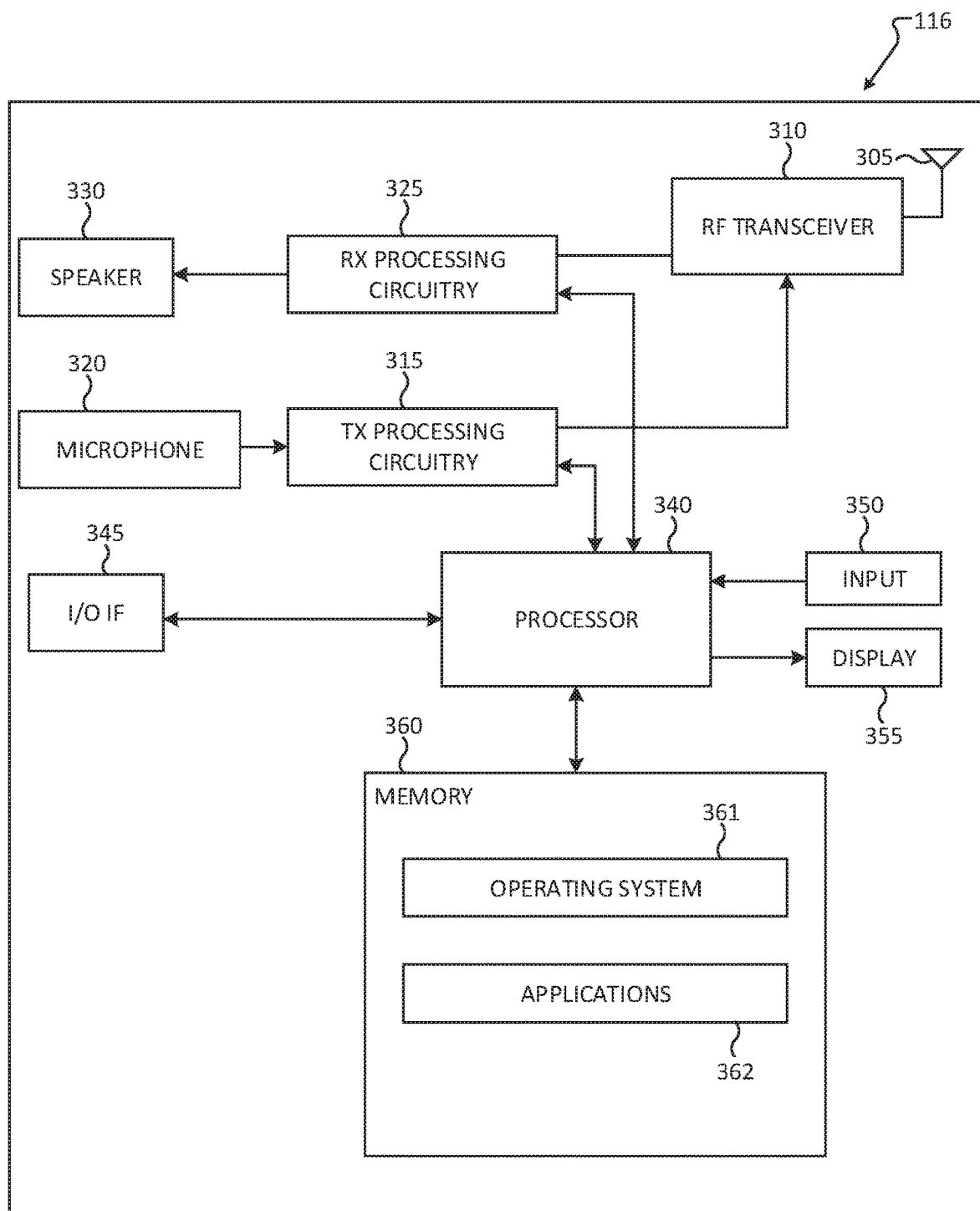
FIG. 3A illustrates an example user equipment (UE) according to various embodiments of the present disclosure.

FIG. 3A illustrates an example UE according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB, such as the gNB 102, of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is then transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for receiving scheduling information in a communication system with multiple service/priority type as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., a keypad, touchscreen, button, etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, various embodiments of the present disclosure enable the UE 116 to receive scheduling information in a communication system with multiple service/priority types. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
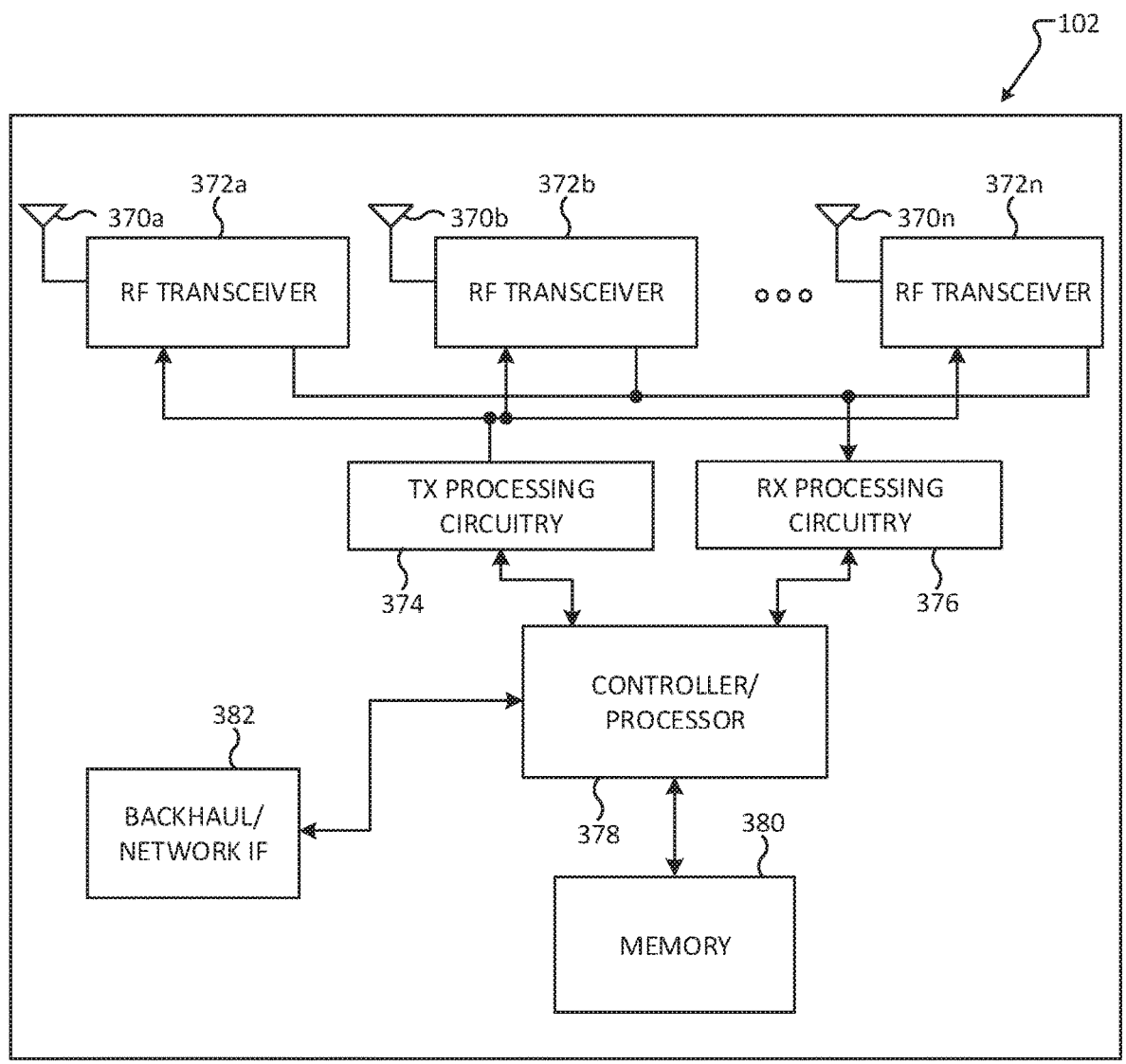
FIG. 3B illustrates an example base station (BS) according to various embodiments of the present disclosure.

FIG. 3B illustrates an example gNB according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support transmitting scheduling information in a communication system with multiple service/priority type as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. As described in more detail below, the transmit and receive paths of the gNB 102 (implemented using the RF transceivers 372a-372n, TX processing circuitry 374, and/or RX processing circuitry 376) transmit scheduling information in a communication system with multiple service/priority types.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

FIG. 4A illustrates an example transmitter structure according to various embodiments of the present disclosure. The example transmitter structure 401 illustrated in FIG. 4A is for illustration only and should not be construed as limiting. FIG. 4A does not limit the scope of the present disclosure to any particular transmitter structure. One or more of the components illustrated in FIG. 4A can be implemented in specialized circuitry configured to perform the noted functions or one or more of the components can be implemented by one or more processors executing instructions to perform the noted functions. For example, the transmitter structure 401 can be implemented in a UE 111-116 or a gNB 101-103 that implements the transmit path 200. Other embodiments can be used without departing from the scope of the present disclosure.

As shown in FIG. 4A, information bits, such as DCI bits or data bits 402, are encoded by encoder 404, rate matched to assigned time/frequency resources by rate matcher 406 and modulated by modulator 408. Subsequently, modulated encoded symbols and DMRS or CSI-RS 410 are mapped to SCs 412 by SC mapping unit 414, an inverse fast Fourier transform (IFFT) is performed by a filter 416, a cyclic prefix (CP) is added by CP insertion unit 418, and a resulting signal 422 is filtered by a filter and then transmitted by a radio frequency (RF) unit 420.

FIG. 4B illustrates example receiver structure using OFDM according to various embodiments of the present disclosure. The example receiver structure 431 illustrated in FIG. 4B is for illustration only and should not be construed as limiting. FIG. 4B does not limit the scope of the present disclosure to any particular receiver structure. One or more of the components illustrated in FIG. 4B can be implemented in specialized circuitry configured to perform the noted functions or one or more of the components can be implemented by one or more processors executing instructions to perform the noted functions. For example, the receiver structure 431 can be implemented in a UE 111-116 or a gNB 101-103 that implements the receive path 250. Other embodiments can be used without departing from the scope of the present disclosure.

As illustrated in FIG. 4B, a received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

A time unit for DL signaling or for UL signaling on a cell is one symbol. A symbol belongs to a slot that includes a number of symbols such as 14 symbols and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. An RB in one symbol of a slot is referred to as physical RB (PRB) and includes a number of resource elements (REs). For example, a slot can have a duration of 1 millisecond and include 14 symbols and an RB can have a BW of 180 kHz and include 12 SCs with SC spacing of 15 kHz. As another example, a slot can have a duration of 0.25 milliseconds and include 14 symbols and an RB can have a BW of 720 kHz and include 12 SCs with SC spacing of 60 kHz.

DL signals include data signals conveying information content, control signals conveying DL control information (DCI), and reference signals (RS) that are also known as pilot signals. A gNB, for example the gNB 102, can transmit data information or DCI through respective physical DL shared channels (PDSCHs) or physical DL control channels (PDCCHs). The gNB can transmit one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources can be used. For interference measurement reports (IMRs), CSI interference measurement (CSI-IM) resources associated with a zero power CSI-RS (ZP CSI-RS) configuration can be used.

A CSI process can include NZP CSI-RS and CSI-IM resources. A UE, for example the UE 116, can determine CSI-RS transmission parameters through DL control signaling or higher layer signaling, such as radio resource control (RRC) signaling from a gNB. Transmission instances of a CSI-RS can be indicated by DL control signaling at the physical layer or configured by higher layer signaling. A DMRS is typically received by a UE, such as the UE 116, only in the BW of a respective PDCCH or PDSCH reception and the UE can use the DMRS to demodulate data or control information.

A UE typically monitors multiple candidate locations for respective potential PDCCH receptions (PDCCH candidates) to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) or MCS-C-RNTI and serves as a UE identifier. For a DCI format scheduling a PDSCH conveying system information (SI), the RNTI can be a system information RNTI (SI-RNTI). For a DCI format scheduling a PDSCH providing a random access response (RAR), the RNTI can be a random access RNTI (RA-RNTI). For a DCI format providing transmission power control (TPC) commands to a group of UEs, the RNTI can be a transmission power control RNTI (TPC-RNTI). For a DCI format indicating discontinuous transmission from a gNB in a previous slot, the RNTI can be an interruption RNTI (INT-RNTI). Each RNTI type can be configured to a UE through higher-layer signaling such as RRC signaling.

A DCI format with CRC scrambled by a C-RNTI and scheduling PDSCH reception to a UE is also referred to as DL DCI format or DL assignment while a DCI format with CRC scrambled by a C-RNTI and scheduling PUSCH transmission from a UE is also referred to as UL DCI format or UL grant. An UL DCI format can be a DCI format 0_0 or a DCI format 0_1 and a DL DCI format can be a DCI format 1_0 or a DCI format 1_1. To maintain a maximum number for sizes of DCI formats with CRC scrambled by a C-RNTI, such as for example 3 sizes, when the UE is configured to monitor PDCCH for detection of UL DCI formats and of DL DCI formats having more than 3 different sizes, padding bits with value of binary zero are appended to DCI format 0_0 when it has a smaller size than DCI format 1_0, or to DCI format 1_0 when it has a smaller size than DCI format 0_0, in order to obtain a same size for DCI format 0_0 and DCI format 1_0. No padding bits are appended to DCI format 0_1 or DCI format 1_1 respective sizes remain different when a total number of sizes for UL DCI formats and for DL DCI formats is 3.

A PDCCH reception can be within a set of PRBs in a slot corresponding to a set of RBs and a set of consecutive symbols in a slot. A gNB can configure a UE one or more sets of PRB sets, also referred to as control resource sets (CORESETs), for PDCCH receptions. A number of symbols for a CORESET is one, two, or three. A PDCCH reception can be in control channel elements (CCEs) that are included in a CORESET. A UE determines CCEs for decoding a PDCCH candidate based on a search space. A set of PDCCH candidates for a DCI format with a C-RNTI, a CS-RNTI, or an MCS-C-RNTI defines a corresponding UE-specific search space set (USS set) for the DCI format where a UE, such as the UE 116, determines PDCCH candidate locations according to a USS. A set of PDCCH candidates for a DCI format with an RNTI that can be configured to multiple UEs defines a common search space set (CSS set) where a UE, such as the UE 116, determines PDCCH candidate locations according to a CSS. A search space set is associated with a CORESET and with one or more DCI formats where a UE, such as the UE 116, monitors PDCCH candidates for detection of the one or more DCI formats according to the search space set, where monitoring means reception of a PDCCH candidate and decoding of a DCI format associated with the PDCCH candidate by the UE. A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for a corresponding active DL BWP.

A UE, such as the UE 116, determines a PDCCH monitoring occasion on an active DL BWP from a PDCCH monitoring periodicity of $k_s$ slots, a PDCCH monitoring offset of $o_s$ slots, and a PDCCH monitoring pattern within a slot that is provided by a bitmap indicating first symbol(s) of a CORESET within a slot for PDCCH monitoring. For search space set s, the UE determines that a PDCCH monitoring occasion(s) exists in a slot with number $n_{s,f}^{\mu}$ in a frame with number $n_f$ if $(n_f \cdot N_{slot}^{frame,\mu} + n_{s,f}^{\mu} - o_s) \bmod k_s = 0$ where $N_{slot}^{frame,\mu}$ is a number of slots per frame for subcarrier spacing (SCS) configuration $\mu$. The UE monitors PDCCH for search space set s for $T_s$ consecutive slots, starting from slot $n_{s,f}^{\mu}$, and does not monitor PDCCH for search space set s for the next $k_s - T_s$ consecutive slots. If the PDCCH monitoring pattern indicates to the UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In various embodiments, for example, the UE can be configured with parameters for a search space set for monitoring PDCCHs to decode a DCI format 0_0 that schedules a PUSCH transmission or to decode a DCI format 1_0 that schedules a PDSCH reception. The UE can also be configured with parameters for a search space set for monitoring PDCCHs to decode a DCI format 0_1 that schedules a PUSCH transmission or to decode a DCI format 1_1 that schedules a PDSCH reception.

Figure 5A:
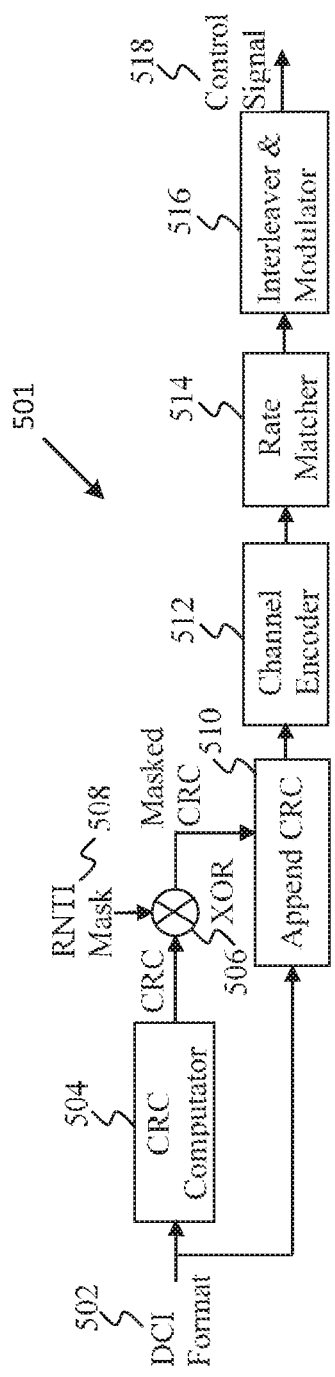
FIG. 5A illustrates an example encoding process for a downlink control information (DCI) format according to various embodiments of the present disclosure.

For example, FIG. 5A illustrate an example encoding process according to various embodiments of the present disclosure. More particularly, FIG. 5A illustrates an encoding process for a DCI format according to various embodiments of the present disclosure. The embodiment of the encoding process shown in FIG. 5A is for illustration only and should not be construed as limiting. FIG. 5A does not limit the scope of the present disclosure to any particular encoding process. One or more of the steps illustrated in FIG. 5A can be implemented in specialized circuitry configured to perform the noted functions or one or more of the components can be implemented by one or more processors executing instructions to perform the noted functions. For example, the encoding process 501 can be implemented in a UE 111-116 or a gNB 101-103 that implements the encoding process 501. Other embodiments can be used without departing from the scope of the present disclosure.

A gNB, such as the gNB 102, separately encodes and transmits each DCI format in a respective PDCCH. When applicable, a RNTI for a UE, such as the UE 116, that a DCI format is intended for masks a CRC of the DCI format codeword in order to enable the UE 116 to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of (non-coded) DCI format bits 502 is determined using a CRC computation unit 504, and the CRC is masked using an exclusive OR (XOR) operation unit 506 between CRC bits and RNTI bits 508. The XOR operation is defined as XOR(0,0)=0, XOR(0,1)=1, XOR(1,0)=1, XOR(1,1)=0. The masked CRC bits are appended to DCI format information bits using a CRC append unit 510. An encoder 512 performs channel coding (such as tail-biting convolutional coding or polar coding), followed by rate matching to allocated resources by rate matcher 514. Interleaving and modulation units 516 apply interleaving and modulation, such as QPSK, and the output control signal 518 is transmitted.

Figure 5B:
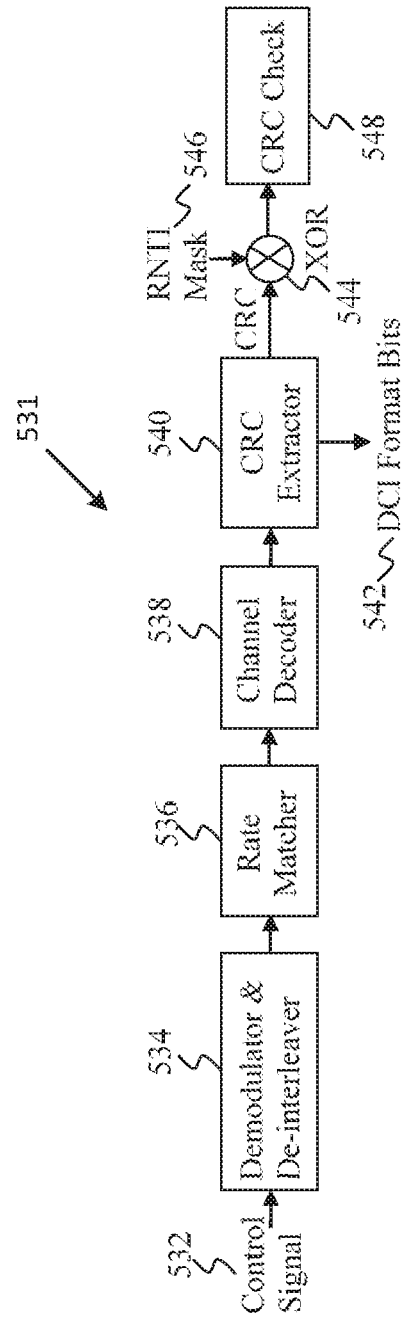
FIG. 5B illustrates an example decoding process for a DCI format according to various embodiments of the present disclosure.

FIG. 5B illustrates an example decoding process according to various embodiments of the present disclosure. More particularly, FIG. 5B illustrates an example decoding process for a DCI format for use with a UE according to various embodiments of the present disclosure. The embodiment of the decoding process shown in FIG. 5B is for illustration only and should not be construed as limiting. FIG. 5B does not limit the scope of the present disclosure to any particular decoding process. One or more of the steps illustrated in FIG. 5B can be implemented in specialized circuitry configured to perform the noted functions or one or more of the components can be implemented by one or more processors executing instructions to perform the noted functions. For example, the decoding process 531 can be implemented in a UE 111-116 or a gNB 101-103 that implements the decoding process 531. Other embodiments can be used without departing from the scope of the present disclosure. In various embodiments, the decoding process 531 can be a complementary process to the encoding process 501 illustrated in FIG. 5A.

A received control signal 532 is demodulated and de-interleaved by a demodulator and a de-interleaver 534. A rate matching applied at a gNB, such as the gNB 102, transmitter is restored by rate matcher 536, and resulting bits are decoded by decoder 538. After decoding, a CRC extractor 540 extracts CRC bits and provides DCI format information bits 542. The DCI format information bits are de-masked 544 by an XOR operation with a RNTI 546 (when applicable) and a CRC check is performed by unit 548. When the CRC check succeeds (check-sum is zero), the DCI format information bits are considered to be valid. When the CRC check does not succeed, the DCI format information bits are considered to be invalid.

A UE has a predetermined capability, as a function of a sub-carrier spacing (SCS) used for PDCCH reception in a DL bandwidth part (DL BWP) of a cell, for a maximum number of PDCCH candidates and for a maximum number of non-overlapping CCEs for PDCCH receptions in CORESETs per slot and per serving cell. For example, for 15 kHz SCS and for 120 kHz SCS, a UE capability for a maximum number of PDCCH candidates in CORESETs per slot is 44 and 20, respectively, and a UE capability for a maximum number of non-overlapping CCEs for PDCCH receptions in CORESETs per slot is 56 and 32, respectively per serving cell.

UL signals also include data signals conveying information content, control signals conveying UL control information (UCI), DMRS associated with data or UCI demodulation, sounding RS (SRS) enabling the gNB 102 to perform UL channel measurement, and a random access (RA) preamble enabling a UE to perform random access. The transceiver 310 of the UE 116 transmits data information or UCI through a respective physical UL shared channel (PUSCH) or a physical UL control channel (PUCCH). When the UE 116 simultaneously transmits data information and UCI, the UE can multiplex both in a PUSCH. UCI includes hybrid automatic repeat request acknowledgement (HARQ-ACK) information, indicating correct or incorrect detection of transport blocks (TBs) with data information in a PDSCH, scheduling request (SR) indicating whether the UE 116 has data in its buffer, and CSI reports enabling a gNB to select appropriate parameters for PDSCH or PDCCH transmissions to the UE 116. For UCI multiplexing is a PUSCH, the UE 116 can determine a number of REs according to a UCI type. For systems operating with hybrid beamforming, UCI can also include beam information such as an index for a set of quasi-collocation parameters, from multiple sets of quasi-collocation parameters, for a received signal and a corresponding reference signal received power (RSRP) value.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS, SRS, and phase tracking RS (PTRS). In some embodiments, DMRS can be transmitted only in a BW of a respective PUSCH or PUCCH transmission. A gNB can use a DMRS to demodulate information in a respective PUSCH or PUCCH. SRS is transmitted by the transceiver 310 of the UE 116 to provide a gNB with an UL CSI and, for a TDD system, an SRS transmission can also provide a PMI for DL transmissions by the gNB. PTRS is transmitted in PUSCH REs in order to enable a gNB, such as the gNB 102, receiver to obtain a track a phase of the received signal. Additionally, in order to establish synchronization or an initial RRC connection with the gNB 102, the UE 116 can transmit a physical random access channel (PRACH).

The UE 116 sets a power for a transmission of channel or signal, such as PUSCH, PUCCH, or SRS, with an objective to achieve a corresponding reliability target by achieving a respective target received single-to-interference and noise ratio (SINR) or a target block error rate (BLER) at a reception point of a cell of a gNB while controlling interference to neighboring cells. UL power control (PC) includes open-loop PC (OLPC) with cell-specific and UE-specific parameters and closed-loop PC (CLPC) corrections provided to the UE 116 by the gNB 102 through transmission PC (TPC) commands. When a PUSCH transmission is scheduled by a DCI format in a PDCCH reception, a TPC command is included in the DCI format.

Various embodiments of the present disclosure recognize that 5G systems can flexibly support multiple service/priority types in a same DL BWP or UL BWP that require BLER targets for data or control information that are different by orders of magnitude and require widely different latencies for a successful delivery of a transport block (TB). For PDSCH reception by the transceiver 310 of the UE 116 that provides a TB requiring low latency and high reliability, a serving gNB 102 can suspend any ongoing transmission that would interfere (use same resources in the time/frequency/spatial domains) with the PDSCH reception of the TB by the transceiver 310 of the UE 116. Such interference avoidance is a more difficult task for a PUSCH transmission from a UE that provides a TB requiring low latency and high reliability.

For a PUSCH transmission that is scheduled by an UL DCI format in a PDCCH reception by UE 116, the gNB 102 has some flexibility to avoid ongoing or future transmissions from other UEs that would interfere with the PUSCH transmission from the UE 116 through a resource assignment that would avoid such interference. However, as previously scheduled transmissions may occupy a substantial part of an active UL BWP, interference avoidance through scheduling may not be always possible. Accordingly, various approaches can be used to ensure the reliability of a PUSCH transmission.

One approach to ensure the reliability of a PUSCH transmission from a UE, such as the UE 116, that would be interfered by transmissions from other UEs is for a gNB, such as the gNB 102, to increase a power for the PUSCH transmission from the UE and possibly employ interference cancelation such as serial interference cancellation. The applicability of this approach is limited to UEs that can increase a PUSCH transmission power and is therefore not available to all UEs.

Another approach is for the gNB 102 to instruct the other UEs 111-115 to cancel their transmissions at least in a set of time/frequency/spatial resources that would interfere with the PUSCH transmission from the UE 116. For example, the gNB 102 can provide an indication to the other UEs 111-115 to cancel their transmissions through a PDCCH transmission that includes a DCI format that can be detected by all UEs 111-116 and informs of a set of time-frequency resources where transmissions from the other UEs 111-115 need to be canceled. For brevity, the DCI format is referred to as DCI format 2_4. However, the applicability of this approach requires that a UE monitors PDCCHs in multiple occasions within a slot as a PUSCH transmission for the UE 116 needs to be scheduled with a small latency as, otherwise, the PUSCH transmission can be scheduled in a next slot and interference from other transmissions can be avoided by the scheduler. This approach further requires that when a TB included in the PUSCH transmission requires high reception reliability at the gNB 102, all interfering UEs detect the DCI format provided by a PDCCH with same or better reception reliability as the one for the TB at the gNB 102. This in turn requires use of a large CCE aggregation level for the PDCCH transmission. The combination of a short monitoring periodicity and a large number of CCEs that need to be used for a PDCCH transmission providing a DCI format indicating a set of time and/or frequency resources where transmissions from UEs need to be canceled increases an implementation complexity for a UE in a number of non-overlapping CCEs that the UE needs to perform channel estimation within a time period such as a slot or a fraction of a slot.

Accordingly, various embodiments of the present disclosure recognize the advantage of providing mechanisms for a UE, such as the UE 116, to monitor PDCCH that includes a DCI format indicating to the UE 116 a set of time and/or frequency resources where the UE 116 shall cancel a transmission while mitigating an increase in a number of non-overlapping CCEs where the UE 116 needs to perform channel estimation in a slot. CCEs for PDCCH candidates are non-overlapping if they correspond to different CORESET indexes or to different first symbols for the reception of the respective PDCCH candidates. CCEs with different indexes in a same CORESET are also non-overlapping.

In some embodiments, a PUSCH transmission from the UE 116 can be autonomous, without an associated UL DCI format from the gNB 102, on resources from a set of resources that is provided to the UE 116 from the gNB 102 by higher layers. For brevity, such a PUSCH transmission is referred to as grant-free PUSCH transmission (GF-PUSCH) or configured-grant PUSCH transmission (CG-PUSCH). For a CG-PUSCH transmission from the UE 116, it is not possible for the gNB 102 to indicate to any interfering UEs 111-115 to cancel their transmissions as the gNB 102 cannot know in advance of the CG-PUSCH transmission from the UE 116. One approach for the gNB 102 to avoid or mitigate the impact of intra-cell interference to the CG-PUSCH transmission is to indicate, for example at the beginning of each slot where CG-PUSCH transmissions can occur, a set of time resources and a set of frequency resources, jointly referred to as a set of time-frequency resources for brevity, or a set of frequency resources (assuming all symbols of the slot are used for transmissions) with transmissions from other UEs 111-115. The UE 116 with the CG-PUSCH transmission can then select a resource from the set of resources that is least impacted by intra-cell interference for the CG-PUSCH transmission. For example, that resource can be the one with the smallest number of RBs (or REs) used for transmissions by other UEs 111-115. If no such resources are available, such as when all time-frequency resources in the set of time-frequency resources for a CG-PUSCH transmission at least partially overlap with time-frequency resources for transmissions from other UEs 111-115, the UE 116 can also be configured with a set of transmission power control parameters to use when a CG-PUSCH transmission includes RBs (or REs) that are indicated by the gNB 102 to include intra-cell interference from other UEs 111-115 transmitting to the gNB 102.

However, similar to a PUSCH transmission that is scheduled by an UL DCI format, the UE 116 may not always be capable to increase a PUSCH transmission power to circumvent interference. Also, when the UE 116 is capable of increasing a PUSCH transmission power, an amount the PUSCH transmission power needs to increase according to an amount of interference. Therefore, various embodiments of the present disclosure recognize the advantages of enabling the UE 116 with a CG-PUSCH transmission that may experience intra-cell interference to improve a reception reliability for an associated TB at the gNB 102 without having to increase a CG-PUSCH transmission power. Various embodiments of the present disclosure further recognize the advantages of enabling the UE 116 with a CG-PUSCH transmission that may experience intra-cell interference to adjust a CG-PUSCH transmission power according to a level of intra-cell interference. Additionally, various embodiments of the present disclosure recognize the advantages of minimizing a probability that a CG-PUSCH transmission from the UE 116 is interfered by transmissions from other UEs 111-115 on a same serving cell of the gNB 102.

Various embodiments of the present disclosure recognize that PUCCH transmissions from the UE 116 in resources indicated by a DL DCI format can experience similar challenges as the ones for a PUSCH transmission from the UE 116.

In some embodiments, a UE, such as the UE 116, can be configured to support different service/priority types such as mobile broadband (MBB), for example for internet access or video download, and ultra-reliable low latency communications (URLLC), for example for augmented/virtual reality (AR/VR) services where, for example, a DCI format scheduling a PUSCH transmission for URLLC service indicates a larger priority than a DCI format scheduling a PUSCH transmission for MBB service. Because communication requirements for different service/priority types can be different, DCI formats used for scheduling PDSCH receptions or PUSCH transmissions to the UE 116 for one service type can be different than DCI formats for another service type and corresponding PDCCH transmissions can require different CCE aggregation levels to accommodate different reliability requirements for detection of corresponding DCI formats. In order to simplify UE implementation, a number of sizes for DCI formats scheduling UE-specific PDSCH receptions or PUSCH transmissions, such as DCI formats with CRC scrambled by a C-RNTI or an MCS-C-RNTI, can be limited, for example, to three. Various embodiments of the present disclosure recognize that when the UE 116 is configured to monitor a number of DCI formats, a corresponding number of DCI format sizes does not exceed a limit of DCI format sizes that can be either predetermined in a system operation or indicated by the UE 116 as part of a UE capability. Accordingly, various embodiments of the present disclosure provide a UE that can monitor DCI formats corresponding to different service/priority types and provide a limit, for example of three, for the sizes of DCI formats scheduling UE-specific PDSCH receptions or PUSCH transmissions.

Therefore, various embodiments of the present disclosure enable a UE 116 to monitor PDCCH that includes a DCI format indicating to the UE 116 a set of time and/or frequency resources where the UE 116 shall cancel a transmission while mitigating an increase in a number of non-overlapping CCEs where the UE 116 needs to perform channel estimation in a slot. Further, various embodiments of the present disclosure enable a UE 116 to monitor PDCCH for detection of DCI formats associated with different service/priority types and to limit a total number of sizes for DCI formats with CRC scrambled with a UE-specific RNTI, such as a C-RNTI or an MCS-C-RNTI, to a predetermined value.

As described herein, a DCI format scheduling a PDSCH reception or a SPS PDSCH release by a UE is referred to as DL DCI format. As described herein, a DCI format scheduling a PUSCH transmission from a UE is referred to as UL DCI format.

An embodiment of the present disclosure provides a UE that monitors PDCCH for detection of a DCI format indicating to the UE a set of time and/or a set of frequency resources where the UE shall cancel a transmission. In this embodiment, the PDCCH providing the DCI format is transmitted in CCEs with locations determined according to a common search space (CSS). The DCI format is referred to as DCI format 2_4.

Figure 6:
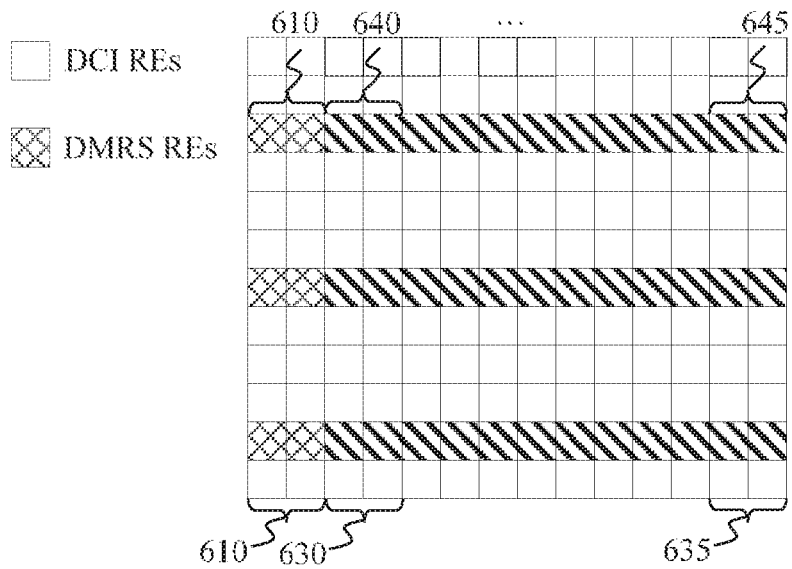
FIG. 6 illustrates a mechanism for using demodulation reference signals (DMRS) for demodulating candidate physical downlink control channel (PDCCH) receptions according to various embodiments of the present disclosure.

For example, FIG. 6 illustrates a mechanism for using DMRS for demodulating candidate PDCCH receptions according to various embodiments of the present disclosure. More particularly, FIG. 6 illustrates a mechanism for using DMRS, associated with candidate PDCCH receptions in a first occurrence of an associated CORESET of a search space set in a slot, for demodulating candidate PDCCH receptions in subsequent occurrences of the CORESET of the search space set in the slot, according to various embodiments of the present disclosure. The embodiment of the mechanism shown in FIG. 6 is for illustration only and should not be construed as limiting. FIG. 6 does not limit the scope of the present disclosure to any particular mechanism for using DMRS for demodulating candidate PDCCH receptions.

As shown in FIG. 6, an increase in a number of non-overlapping CCEs where a UE, for example the UE 116, performs channel estimation to demodulate symbols of PDCCH candidates for detection of DCI format 2_4 is mitigated by limiting a number of PDCCH candidates per CCE aggregation level for DCI format 2_4, for example to a maximum of two. A first CCE for a first PDCCH candidate for a CCE aggregation level can be predefined in a system operation or configured to the UE 116 by higher layers. For example, the UE 116 can monitor one PDCCH candidate with an aggregation level of 8 CCEs starting from the first CCE or the ninth CCE of a CORESET and monitor one PDCCH candidate with an aggregation level of 4 CCEs starting from the first CCE or the fifth CCE of the CORESET, respectively. Further, the UE 116 can assume the DMRS presence regardless of whether or not a PDCCH with DCI format 2_4 or with another DCI format exists in the set of CCEs in the first CORESET occurrence for a search space set in the slot. CCEs for PDCCH candidates can also be assumed to be overlapping even when they correspond to different first symbols for the reception of the respective PDCCH candidates. Accordingly, the UE 116 can assume that a same precoding is used for the reception of the PDCCH candidates for DCI format 2_4 in different PDCCH monitoring occasions within a slot.

The UE 116 can monitor a search space set for PDCCH receptions in a CORESET of 2 symbols where the PDCCH receptions occur in seven instances within a slot. As shown in FIG. 6, for a CCE of a PDCCH candidate for a DCI format, such as for DCI format 2_4 or, in general, for any DCI format for which a UE receives a corresponding PDCCH at least according to a CSS, in a first occurrence of the PDCCH receptions in a CORESET of the search space set in the slot 610, the UE 116 assumes reception of DMRS in respective REs regardless of whether or not a serving gNB transmits the PDCCH candidate. For a subsequent occurrence of the PDCCH receptions in a CORESET in the slot 630, 635, the UE 116 is not required to use for channel estimation the REs 640, 645 corresponding to DMRS reception for the PDCCH candidate for the DCI format in the first occurrence of the PDCCH receptions in the CORESET in the slot. The REs 640, 645 corresponding to DMRS reception can be used by a gNB, such as the gNB 102, to actually transmit DMRS, to transmit other signaling, or can remain unused and a corresponding power may be used to increase a transmission power on other REs.

Another approach for supporting an increase in a number of non-overlapping CCEs is for a UE, for example the UE 116, to perform channel estimation to demodulate symbols of PDCCH candidates by counting a number of non-overlapping CCEs for CORESETs per PDCCH monitoring occasions, or per a predetermined number of consecutive symbols, instead of per slot for a corresponding SCS configuration/value. As is subsequently described, several predetermined numbers of consecutive symbols that include CORESETs for PDCCH monitoring occasions can be supported. This approach does not mitigate an actual increase in a number of non-overlapping CCEs that the UE 116 uses to perform channel estimation for demodulating symbols of PDCCH candidates but provides a more realistic representation of the UE complexity associated with channel estimation due to a number of non-overlapping CCEs for PDCCH monitoring. This more realistic representation is provided because the associated UE complexity is determined by a number of channel estimates the UE 116 needs to obtain within an absolute time period between the beginning of CORESETs for PDCCH receptions and does not directly relate to a slot duration.

For example, a UE complexity for performing channel estimation over N non-overlapping CCEs per slot is approximately half for SCS of 15 kHz relative to SCS of 30 kHz (because the slot duration for SCS of 15 kHz is twice the slot duration for SCS of 30 kHz). A UE complexity for performing channel estimation over N non-overlapping CCEs in CORESETs during the first 3 symbols of a slot is typically larger than a UE complexity for performing channel estimation over 2N non-overlapping CCEs in CORESETs distributed over an entire slot. For example, a number of non-overlapping CCEs in CORESETs can be counted per 2 or 4 symbols with SCS of 15 kHz or per 4 or 7 symbols with SCS of 30 kHz. Then, for example for 15 kHz SCS, a limit for a number of non-overlapping CCEs for PDCCH monitoring can be defined for CORESETs per two symbols of a slot. For example, non-overlapping CCEs in CORESETs over the first six consecutive symbols of a slot are not counted towards a maximum number of non-overlapping CCEs that the UE 116 can use to monitor PDCCH candidates. Instead, non-overlapping CCEs in CORESETs over a first span of the first three consecutive symbols or in CORESETs over a second span of the second three consecutive symbols of a slot are counted.

A UE complexity depends on a time that the UE 116 has available to perform channel estimations over non-overlapping CCEs in a set of CORESETs. For a given SCS value of PDCCH receptions in sets of CORESETs that are within a predetermined number of symbols, the time the UE 116 has available to perform channel estimations over non-overlapping CCEs in a set of CORESETs is determined by a difference between (a) a number of symbols between a first symbol for the set of CORESETs and a first symbol of a next set of CORESETs and (b) the predetermined number of symbols. The larger the difference, the more time the UE has available to perform channel estimations over a number of non-overlapping CCEs, and the larger the number of the non-overlapping CCEs.

A UE implementation can prioritize decoding of PDCCH candidates associated with search space sets for DCI formats associated with applications requiring lower latency. For applications that are not delay sensitive, such as for MBB services, the UE 116 typically monitors all PDCCH candidates for associated DCI formats in CORESETs at the first few symbols of a slot. For applications that are delay sensitive, such as URLLC, the UE 116 may need a substantially uniform distribution of PDCCH candidates in CORESETs over a slot as scheduling may need to occur with time granularity smaller than one slot. The UE 116 may further be configured to monitor PDCCH candidates for a majority of DCI formats associated with PDCCH receptions according to a CSS, such as for example for all DCI formats except for DCI format 2_4, in CORESETs located in the first few symbols of a slot, such as the first one, two, or three symbols of a slot. Due to the sporadic nature and the typically small TB sizes associated with URLLC services, a total number of PDCCH candidates and a number of non-overlapping CCEs in CORESETs of PDCCH monitoring occasions for scheduling URLLC service can be smaller than a total number of candidates and a number of non-overlapping CCEs in CORESETs of PDCCH monitoring occasions for scheduling MBB service.

Consequently, an increase in a number of non-overlapping CCEs (and of PDCCH decoding operations) for a UE supporting both MBB and URLLC services can be non-uniform relative to ones for a UE supporting only MBB (and/or non-latency sensitive URLLC services). Therefore, the UE 116 capability for performing channel estimation over a number of non-overlapping CCEs in CORESETs per slot can be defined to be M non-overlapping CCEs for a first occurrence of CORESETs within a predetermined number of symbols, such as 2 symbols, at the beginning of the slot and N non-overlapping CCEs per each remaining occurrence of CORESETs within the predetermined of symbols in a slot, where N<M. M corresponds to a UE capability for PDCCH monitoring over both a slot and over a number of symbols that is less than a number of symbols per slot, and N corresponds to UE capability for PDCCH monitoring over the number of symbols. For example, M=56 or M=72 and N=24 or N=32. A similar distribution can apply for a number of PDCCH candidates per slot. Using a non-uniform distribution can address scheduling requirements for the UE 116 that supports both MBB and URLLC services without materially increasing the complexity of the UE 116 even though the UE 116 is required to monitor a larger total number of non-overlapping CCEs or a larger total number of PDCCH candidates per slot.

Figure 7:
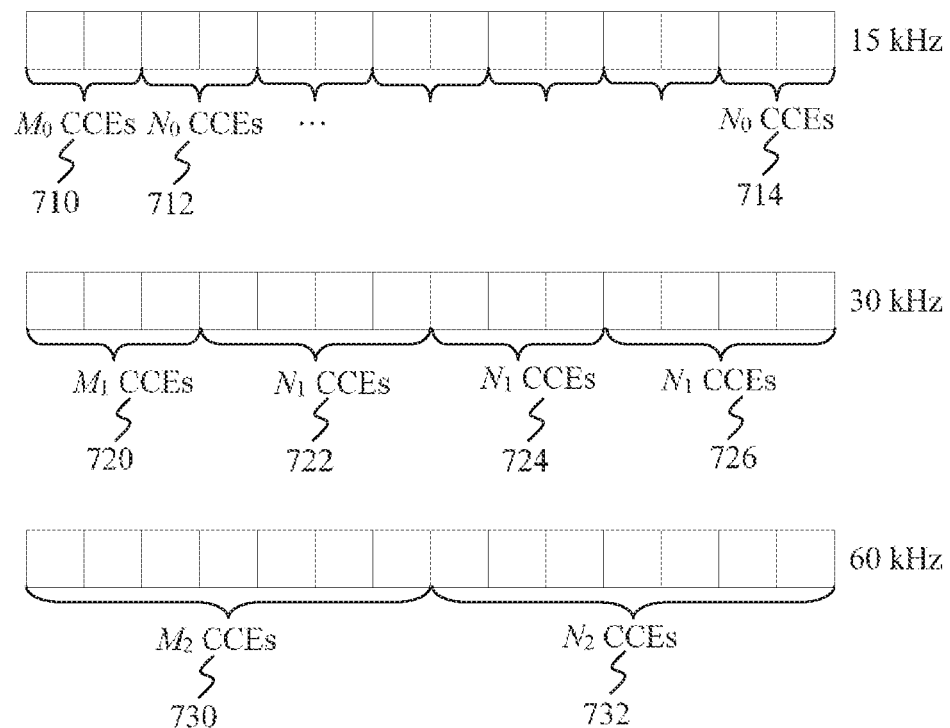
FIG. 7 illustrates a distribution of a maximum number of non-overlapping control channel elements (CCEs) in CORESETs in a slot according to various embodiments of the present disclosure.

For example, FIG. 7 illustrates a distribution of a maximum number of non-overlapping CCEs in CORESETs in a slot according to various embodiments of the present disclosure. More particularly, FIG. 7 illustrates a distribution of a maximum number of non-overlapping CCEs in CORESETs in a slot that a UE can obtain channel estimates for demodulating control information for a PDCCH candidate according to various embodiments of the present disclosure. The embodiment shown in FIG. 7 is for illustration only and should not be construed as limiting. FIG. 7 does not limit the scope of the present disclosure to any particular distribution.

FIG. 7 shows the capability of a UE, such as the UE 116, for a number of non-overlapping CCEs in CORESETs to perform channel estimation for demodulating control information in received PDCCH candidates. For a SCS of 15 kHz corresponding to a slot duration of 1 msec, the UE 116 can monitor PDCCH over a number of $M_0$ non-overlapping CCEs for CORESETs within a first symbol from the first 2 symbols of a slot 710 and $N_0$ non-overlapping CCEs for CORESETs that start in remaining pairs of symbols of the slot 712, 714, where $N_0 < M_0$. In this case, CORESETs are included within one symbol and first symbols of CORESETs that are not within the one symbol are separated by one symbol. For a SCS of 30 kHz corresponding to a slot duration of 0.5 msec, the UE 116 can monitor PDCCH over a number of $M_1$ non-overlapping CCEs for CORESETs of one symbol that start in the first 3 symbols of a slot 720 and $N_1$ non-overlapping CCEs for CORESETs that start in the next 4 symbols 722, the next 3 symbols 724, and the next 4 symbols 726 of the slot where $N_1 < M_1$. It is noted that, in order to satisfy UE processing requirements over a smallest possible time period, $N_1$ is same regardless of whether a number of symbols between the start of CORESETs is 3 symbols 724 or 4 symbols 722, 726, and $N_1$ is therefore determined based on the smallest number of 3 symbols between the first symbols of CORESETs 724. For a SCS of 60 kHz corresponding to a slot duration of 0.25 msec, the UE 116 can monitor PDCCH over a number of $M_2$ non-overlapping CCEs for CORESETs of one symbol that start in the first 7 symbols (half-slot) of a slot 730 and $N_2$ non-overlapping CCEs over CORESETs that start in the next 7 symbols 732 of the slot where $N_2 < M_2$.

Although FIG. 7 considers a separation of 7 symbols for 60 kHz SCS between first symbols of CORESETs within the first and second 7 symbols of a slot, a separation of 7 symbols can also be applicable for lower SCS such as 15 kHz or 30 kHz.

In general, for a SCS of PDCCH receptions, a UE capability for channel estimation over a number of non-overlapping CCEs depends on a first time, such as 0.25 msec or 0.5 msec, between the beginning of CORESETs spanning a second time, such as 0.1 msec or 0.2 msec, or equivalently on a number of symbols, such as 4 symbols of 7 symbols, between first symbols of CORESETs spanning a second number of symbols, such as 2 symbols or 3 symbols, respectively. The larger a processing time a UE has available to perform channel estimation over non-overlapping CCEs, the larger a maximum number of non-overlapping CCEs that the UE can perform channel estimation.

For a SCS of 120 kHz corresponding to a slot duration of 0.125 msec, a distribution with granularity smaller than a slot of the UE capability for a total number of non-overlapping CCEs per slot, or for a total number of PDCCH candidates per slot, is not required.

As described above, the embodiment described in FIG. 7 should not be construed as limiting. For example, $M_0$, $M_1$, $M_2$ and $M_3$ can correspond to non-overlapping CCEs for CORESETs having the first symbol of the slot as their first symbol. This is because, for MBB services or for CSS, PDCCH receptions by the UE 116 typically start at the first symbol of a slot. The same applies for URLLC services where scheduling happens to be at the beginning of the slot and therefore $M_0$, $M_1$, $M_2$ or $M_3$ represents a combined UE capability for a number of non-overlapping CCEs for PDCCH monitoring over a slot and over symbols of a slot. The additional UE capability for a number of non-overlapping CCEs can be defined per number of symbols between first symbols of CORESETs that are within a predetermined number of symbols and can be smaller than $M_0$, $M_1$, $M_2$, or $M_3$. Therefore, the UE 116 can have a first capability for a number of PDCCH candidates or for a number of non-overlapping CCEs in CORESETs per slot for all supported SCS values for PDCCH receptions, and have a second capability for a number of PDCCH candidates or for a number of non-overlapping CCEs based on a smallest number of symbols, such as 4 symbols or 7 symbols, separating first symbols of CORESETs that are located within a predetermined number of symbols, such as 3 symbols or 2 symbols. The second capability is limited only to the smaller SCS values for PDCCH receptions.

All of the PDCCH monitoring occasions for the UE 116 can be in CORESETs located in any OFDM symbol(s) of a slot with a gap of a number of symbols between first symbols of CORESETs that are within a predetermined number of symbols. A PDCCH monitoring complexity for the UE 116 can be unevenly distributed within the slot. For example, a UE 116 that supports both MBB services and URLLC services can monitor PDCCH in first search space sets that are associated with CORESETs substantially located in symbols at the beginning of a slot and monitor PDCCH in second search space sets that are associated with CORESETs spanning the entire slot. As the UE 116 monitors a larger number of PDCCH candidates at the beginning of the slot and for a given UE capability, the UE 116 spends more time monitoring PDCCH candidates at the beginning of a slot than at later parts of the slot.

For example, at the beginning of a slot, the UE 116 can monitor a maximum of 36 PDCCH candidates over a maximum of 56 non-overlapping CCEs in CORESETs spanning at most the first three symbols of the slot while at a later part of the slot where the UE 116 monitors PDCCH, a maximum number of PDCCH candidates can be 12 or 16 and a maximum number of non-overlapping CCEs can be 24 or 32. The UE 116 can then support PDCCH monitoring occasions in CORESETs that are within a predetermined number of symbols, such as 2 symbols, with a minimum gap between first symbols of the CORESETs, such as 4 symbols. The minimum gap of symbols can be smaller at a later part of the slot than at the beginning of the slot. For example, the UE 116 can monitor a maximum of 36 PDCCH candidates over a maximum of 56 non-overlapping CCEs in CORESETs within the first 3 symbols of a slot. The UE can monitor a maximum of 16 PDCCH candidates over a maximum of 24 non-overlapping CCEs in CORESETs within 2 symbols of the slot after a gap of X1=3 symbols from the first 3 symbols of the slot, or equivalently after a gap of X1=6 symbols from the first symbol of the CORESETs at the beginning of the slot, that is at the sixth and seventh symbols of the slot. The UE can monitor a maximum of 16 PDCCH candidates over a maximum of 24 non-overlapping CCEs over 2 symbols of the slot in CORESETs that start after a gap of X2=2 symbols from the end of the immediately previous CORESETs, or equivalently after a gap of X2=4 symbols from the first symbol of the immediately previous CORESETs, for every other PDCCH monitoring occasion in CORESETs in the slot. Therefore, a minimum gap in number of symbols, such as four symbols, of CORESETs within a predetermined number of symbols, such as two symbols, for PDCCH monitoring occasions in a slot can be larger after the first PDCCH monitoring occasion, such as X1=3 symbols after the end of the previous set of CORESETs, or equivalently 6 symbols between first symbols of sets of CORESETs separated by the gap, than after every other PDCCH monitoring occasion in the slot, such as X2=2 symbols after the end of the previous set of CORESETs, or equivalently 4 symbols between first symbols sets of CORESETs separated by the gap, to reflect the larger PDCCH processing requirements for channel estimation and decoding operations for the UE at the beginning of the slot.

Various embodiments of the present disclosure provide search space sets for DCI formats scheduling different service/priority types and a fulfillment for a limit of a total number of sizes for the DCI formats to a predetermined value for a UE, such as UE 116. The UE 116 supporting multiple service/priority types, such as MBB and URLLC, can be provided multiple search space sets where in addition to one or more search space sets for monitoring PDCCH providing DCI format 0_0 and DCI format 1_0 and one or more search space sets for monitoring PDCCH providing DCI format 0_1 and DCI format 1_1, the UE 116 can include one or more search space sets for monitoring a DCI format 0_2 that schedules a PUSCH transmission (UL DCI format) and a DCI format 1_2 that schedules a PDSCH reception (DL DCI format). DCI format 0_2 and DCI format 1_2 can have a same size and padding bits can be used for one of the two DCI formats when necessary, to reduce a number of associated PDCCH decoding operations for the two DCI formats or to avoid increasing a total number of DCI format sizes above a predetermined number such as three DCI formats with CRC scrambled by a C-RNTI. A search space set for DCI format 0_2 and DCI format 1_2 can be different than a search space set for any of the other DCI formats corresponding to UE-specific search spaces (USS) because DCI format 0_2 and DCI format 1_2 can be associated with different reception reliability requirements, such as BLERs, and consequently require different number of candidates per CCE aggregation level for corresponding PDCCH receptions. To improve a reception reliability for DCI format 0_2 or DCI format 1_2, fields of DCI format 0_2 or DCI format 1_2 can have configurable sizes that are smaller than or equal to sizes of same fields in DCI format 0_0 or DCI format 0_1 or in DCI format 1_0 or in DCI format 1_1, respectively. Further, as multiple search space sets can be associated with a same CORESET, instead of defining a slot based periodicity for a search space set associated with DCI format 0_2 and DCI format 1_2, a bitmap indicating corresponding PDCCH monitoring occasions within a slot, or within a number of slots, can be alternatively defined. A value of X for a PDCCH monitoring capability over a number of symbols is equal to a smallest number of symbols between first symbols of CORESETs within a predetermined number of symbols as determined by the bitmap.

In some embodiments, a UE, such as the UE 116, can prioritize an allocation of PDCCH candidates to search space sets for DCI format 0_2 and DCI format 1_2 over an allocation of PDCCH candidates to at least some search space sets associated with common search spaces (CSS). In other embodiments, the UE 116 can assume that a gNB configuration of PDCCH candidates to search space sets is such that the UE 116 can always monitor PDCCH candidates associated with the search space set for DCI format 0_2 and DCI format 1_2.

Similar to the UE capability for performing channel estimation over a number of non-overlapping CCEs per predetermined number of consecutive symbols for a corresponding SCS configuration/value, a UE capability for monitoring PDCCH candidates can be defined over a same predetermined number X of consecutive symbols. As a number of PDCCH decoding operations is typically larger at the beginning of a slot where the UE 116 needs to monitor search space sets for a majority of CSS and USS associated with scheduling PUSCH transmissions or PDSCH receptions associated with eMBB services, UE processing requirements can be relaxed for PUSCH transmissions or PDSCH receptions that are scheduled by DCI formats in respective search space sets at the first symbols of a slot, such as the first two or three symbols of a slot, compared to PUSCH transmissions or PDSCH receptions that are scheduled by DCI formats in respective search space sets at later symbols of the slot. A timeline for PUSCH transmissions or PDSCH receptions can be relaxed for predetermined search space sets, such as search space sets with DCI formats associated with MBB services, and the UE 116 can prioritize decoding operations for other search space sets with DCI formats associated with URLLC services. For example, the UE 116 can prioritize (perform first) PDCCH decoding operations and related processing for a search space set associated with DCI format 0_2 and DCI format 1_2 over PDCCH decoding operations for a search space set associated with DCI format 0_0 and DCI format 1_0, or over PDCCH decoding operations for a search space set associated with DCI format 1_0 and DCI format 1_1. For example, the UE 116 can identify the DCI formats to decode first based on a corresponding size.

In some embodiments, a PDCCH monitoring periodicity for one or more search space sets for the UE 116 can be adjusted by a DCI format because corresponding PDCCH monitoring can be sparser when the UE 116 does not indicate existence of data to transmit, through a buffer status report or through the absence of a positive scheduling request and when a serving gNB, for example the gNB 102, does not have data in its buffer to transmit to the UE 116. For example, a first PDCCH monitoring periodicity for a search space set or a first set of search space sets can be adjusted to a second PDCCH monitoring periodicity for the search space set or to a second set of search space sets, respectively, to provide the UE 116 with a capability for power savings. This can apply to MBB services that are relatively latency tolerant but not to URLLC services that are sporadic and require low latency. Therefore, a dynamic adaptation to a PDCCH monitoring periodicity may not apply for a search space set associated with DCI format 0_2 and DCI format 1_2 and a dynamic adaptation to a PDCCH monitoring periodicity may not apply for a search space set associated with a same CORESET as for a search space set for DCI format 0_2 and DCI format 1_2. In addition, a positive SR transmission by the UE 116 can serve as an implicit trigger by the UE 116 for a PDCCH monitoring periodicity of a search space set, or for a set of search space sets, to revert to a default one, such as the one configured by higher layers for search space sets associated with USS, instead of a longer PDCCH monitoring of the search space set, or for a set of search space sets, that may have been indicated by the gNB through a DCI format or through a MAC control element. Then, after a positive SR transmission, the UE 116 can begin to monitor PDCCH with an increased monitoring periodicity at least for search space sets associated with DCI formats scheduling PUSCH transmissions. Switching a PDCCH monitoring periodicity can be associated with a same search space set or with different search space sets having corresponding different values for a PDCCH monitoring periodicity.

In embodiments where the UE 116 monitors only search space sets for DCI format 0_2 and DCI format 1_2, the UE 116 may not be configured to monitor PDCCH for search space sets associated with some CSS, such as a search space set associated with DCI format 2_0 providing a slot format indicator, a search space set associated with DCI format 2_1 providing an indication of discontinuous transmission by a gNB in one or more previous slots, a search space set associated with DCI format 2_2 providing TPC commands for PUSCH transmissions or PUCCH transmissions, or a search space set associated with DCI format 2_3 providing either TPC commands or both TPC commands and a triggering indication for SRS transmissions. The UE 116 may not monitor the aforementioned search space sets because the DCI formats in the aforementioned search space sets can be associated with a target BLER that can be several orders of magnitude larger than a target BLER for DCI format 0_2 and DCI format 1_2 that are associated with URLLC services. Accordingly, it can be inefficient for a network to decrease the target BLER for the aforementioned DCI formats since their applicability is associated with MBB services and a large number of CCEs that can be used to decrease the target BLER may require increased UE complexity to support in order to obtain associated channel estimates. For example, the UE 116 can have periodic CSI or periodic SRS transmissions spanning symbols that are always UL symbols, or to have periodic CSI-RS receptions spanning symbols that are always DL symbols, and then obtaining an SFI is unnecessary. For example, a larger range of TPC commands can be supported for DCI format 0_2 and DCI format 1_2, for respective PUSCH transmissions and PUCCH transmissions, to accommodate for the UE not obtaining TPC commands by DCI format 2_2.

The UE 116 can monitor a number of different sizes for UE-specific DCI formats that are associated with a USS during a PDCCH monitoring occasion or during a slot. If a maximum number of sizes for UE-specific DCI formats is limited to 3 and as DCI format 0_1 and DCI format 1_1 can have different sizes, when the UE 116 monitors PDCCH for DCI format 0_2 and DCI format 1_2, the UE 116 would monitor a maximum of three sizes for UE-specific DCI formats if DCI format 0_2 and DCI format 1_2 have a same size (size of DCI format 0_2 and DCI format 1_2 is first aligned, when needed, to limit a total number of UE-specific DCI format sizes to 3) as one of the sizes for DCI format 0_0 and DCI format 1_0, or DCI format 0_1, or DCI format 1_1. However, various embodiments of the present disclosure recognize the inefficiency of this approach because DCI format 0_2 and DCI format 12 can require a substantially smaller size than the other DCI formats, while also requiring a BLER that is several orders of magnitude smaller than the BLER of the other DCI formats. Accordingly, various embodiments of the present disclosure enable the maximum number of DCI formats to be maintained at three.

In some embodiments, the maximum number of DCI formats can be maintained at 3 by using a same size for DCI format 0_1 and DCI format 1_1. This embodiment can be more efficient than increasing the size of DCI format 0_2 and DCI format 1_2, particularly when a small number of padding bits is needed for one of DCI format 0_1 and DCI format 1_1. This embodiment provides an equal size for the two DCI formats and decreases a number of PDCCH decoding operations for MBB service. A serving gNB, for example the gNB 102, can indicate, to a UE, such as the UE 116, or the UE 116 can directly perform one of the following in order to maintain a total number of three sizes for DCI formats having CRC scrambled with a C-RNTI after the UE 116 aligns a size for DCI format 0_2 and DCI format 1_2 to a same size:

a) DCI format 0_2 and DCI format 1_2 are padded so that a resulting size is same as for DCI format 0_0 and DCI format 1_0, or b) DCI format 0_2 and DCI format 1_2 are padded so that a resulting size is same as the smaller of the size for DCI format 0_1 and the size for DCI format 1_1, or c) DCI format 0_2 and DCI format 1_2 are padded so that a resulting size is same as for DCI format 1_1, or d) DCI format 0_1 or DCI format 1_1 is padded so that a resulting size is same as for DCI format 1_1 or DCI format 0_1, respectively.

In other embodiments, the maximum number of DCI formats can be maintained at 3 by using a variable DCI format size depending on a corresponding PDCCH monitoring occasion. For example, for PDCCH monitoring occasions where the UE 116 monitors PDCCH for DCI format 0_0. DCI format 1_0, DCI format 0_1, or DCI format 1_1, referred to for brevity as MBB DCI formats, the size of DCI format 0_2 and the size of DCI format 1_2 can be the same (after alignment, when needed) as one of the sizes for the MBB DCI formats. For PDCCH monitoring occasions where the UE 116 does not monitor PDCCH for MBB DCI formats, the size of DCI format 0_2 and the size of DCI format 1_2 can be different, such as smaller.

The UE 116 can also use a variable DCI format size depending on a CORESET for a corresponding search space set. For example, when a same CORESET is associated with a search space set for DCI format 0_2 and DCI format 1_2 and for one or more MBB DCI formats, a size for DCI format 0_2 and DCI format 1_2 can be the same as a size for one MBB DCI format so that DCI format 0_2 and DCI format 1_2 can schedule traffic of different priorities such as MBB or URLLC. When a different CORESET is associated with a search space set for DCI format 0_2 and DCI format 1_2 and for any MBB DCI format, the size of DCI format 0_2 and DCI format 1_2 can be different than a size for any MBB DCI format. Further, in a slot where the UE 116 may not monitor PDCCH candidates for either DCI format 0_0 and DCI format 1_0 or DCI format 0_1, or DCI format 1_1, the UE 116 may not match a size of DCI format 0_2 and of DCI format 1_2 to a size of a MBB DCI format. The UE 116 may also not match a size of DCI format 0_2 and of DCI format 1_2 to a size of a MBB DCI format when the UE 116 is not configured to monitor PDCCH candidates for either DCI format 0_0 and DCI format 1_0, or for DCI format 0_1, or for DCI format 1_1.

Figure 8:
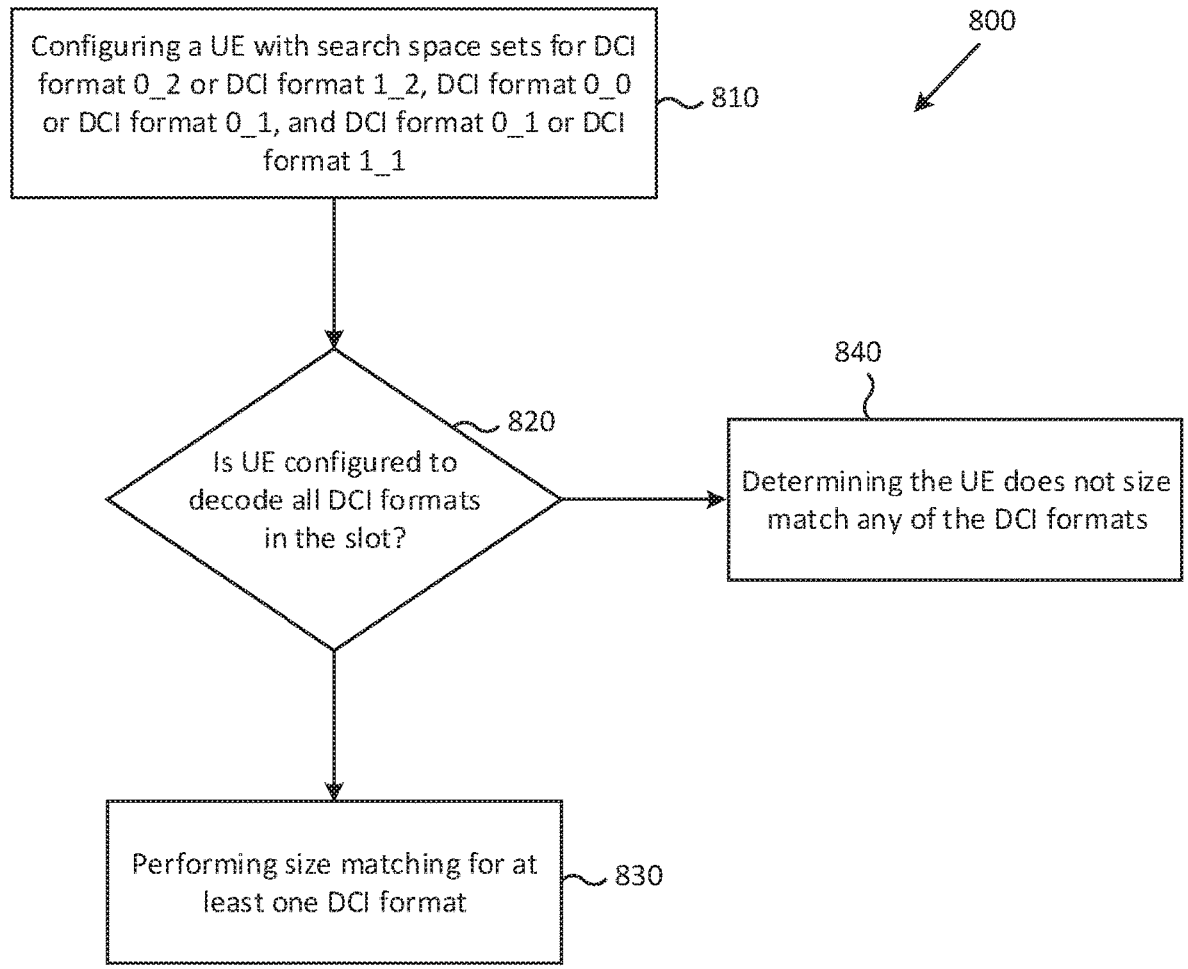
FIG. 8 illustrates a method of determining a DCI format size according to various embodiments of the present disclosure.

For example, FIG. 8 illustrates a method 800 of determining a DCI format size according to various embodiments of the present disclosure. Although described herein as being implemented by the UE 116, the method illustrated in FIG. 8 can be implemented by one or more of the UEs 111-116 and a corresponding method can be performed by one or more of the gNBs 101-103 described in FIG. 1. Other embodiments can be used without departing from the scope of the present disclosure.

In operation 810, a UE, for example the UE 116, is configured with search space sets for DCI format 0_2 or DCI format 1_2, DCI format 0_0 or DCI format 0_1, and DCI format 0_1 or DCI format 1_1. The UE 116 can be configured with the search space sets by a gNB, for example the gNB 102. The search space sets can be stored in the memory

360. The UE 116 can use the search space sets for monitoring PDCCH candidates that provide the DCI formats as described herein.

In operation 820, for a decoding a DCI format in a particular slot or a PDCCH monitoring occasion, the UE 116 determines whether the UE 116 is configured to decode all the DCI formats in the slot or the PDCCH monitoring occasion. If the UE 116 is configured to decode all the DCI formats in the slot or the PDCCH monitoring occasion, the UE 116 performs operation 830. If the UE 116 is not configured to decode all the DCI formats in the slot or the PDCCH monitoring occasion, the UE 116 performs operation 840.

In operation 830, when the UE 116 determines that the UE 116 is configured to decode all the DCI formats in the slot or the PDCCH monitoring occasion, the UE 116 size matches at least one DCI format. For example, when the size of DCI format 0_2 (and DCI format 1_2-size alignment of DCI format 0_2 and DCI format 1_2 is performed first when alignment of sizes of DCI format is needed) is smaller than the size of DCI format 0_0 or DCI format 1_0, the UE 116 size matches the size of DCI format 0_2 (and DCI format 1_2) to the size of DCI format 0_0 or the size of DCI format 1_0. When the size of DCI format 0_2 (and DCI format 1_2) is larger than the size of DCI format 0_0 or the size of DCI format 1_0, the UE 116 either matches the size of DCI format 0_2 (and DCI format 1_2) to the smaller of the sizes of DCI format 0_1 and DCI format 1_1 or matches the smaller of the sizes of DCI format 0_1 and DCI format 1_1 to the larger of the sizes of DCI format 0_1 and DCI format 1_1. In operation 840, when the UE 116 is not configured to decode all the DCI formats in the slot or PDCCH monitoring occasion, the UE 116 does not size match any of the DCI formats.

Various embodiments of the present disclosure adapt parameters for a transmission, from a UE, such as the UE 116, or cancelation of a transmission in response to a detection by the UE 116 of a DCI format 2_4 and for a reception by the UE 116 in response to a configuration of a search space set for DCI format 2_4. The DCI format 2_4 indicates a set of time-frequency resources for suspension of ongoing transmissions. The present disclosure recognizes that limiting a number of information bits, for example to 20 information bits excluding CRC bits, that can be provided by DCI format 2_4 can improve a detection reliability for DCI format 2_4 while reducing a resource overhead required for a corresponding PDCCH reception. Due to the coarse indication of time-frequency resources indicated by DCI format 2_4, DCI format 2_4 can indicate the suspension or cancellation of ongoing transmissions in RBs, and possibly symbols, where a suspension or cancellation of a transmission is not required. In some embodiments, the UE 116 is configured to monitor DCI format 2_4 and either DCI format 0_0 or DCI format 0_1 and DCI format 0_2 and can ignore, for a PUSCH transmission, the indication provided by DCI format 2_4 if the PUSCH transmission is scheduled by DCI format 0_2 or, in general, by a DCI format scheduling a transmission of higher priority. In particular, the UE 116 can apply the indication provided by DCI format 2_4 if the PUSCH transmission is scheduled by DCI format 0_0 or DCI format 0_1 or, in general, by a DCI format scheduling a transmission of lower priority.

In some embodiments, the UE 116 can have multiple CG-PUSCH configurations. For a PUSCH transmission from the UE 116 without an associated UL DCI format (CG-PUSCH), when the UE 116 has multiple CG-PUSCH configurations, the UE 116 can select a CG-PUSCH configuration that avoids a set of time-frequency resources indicated by DCI format 2_4. When no CG-PUSCH configuration from the multiple CG-PUSCH configuration avoids all time-frequency resources of the set of time-frequency resources indicated by DCI format 2_4, the UE 116 can postpone a PUSCH transmission until there is a CG-PUSCH with time-frequency resources that are not indicated by a DCI format 2_4 as unavailable for transmission (avoids all time-frequency resources of the set of time-frequency resources indicated by DCI format 2_4) or until the UE 116 does not detect a DCI format 2_4. Alternatively, the UE 116 can select the CG-PUSCH configuration of time-frequency resources that includes a smallest number of REs from the set of time-frequency resources indicated as unavailable by DCI format 2_4. In addition, the UE 116 can puncture the transmission of CG-PUSCH in REs that are included in the set of time-frequency resources indicated as unavailable by DCI format 2_4.

Figure 9:
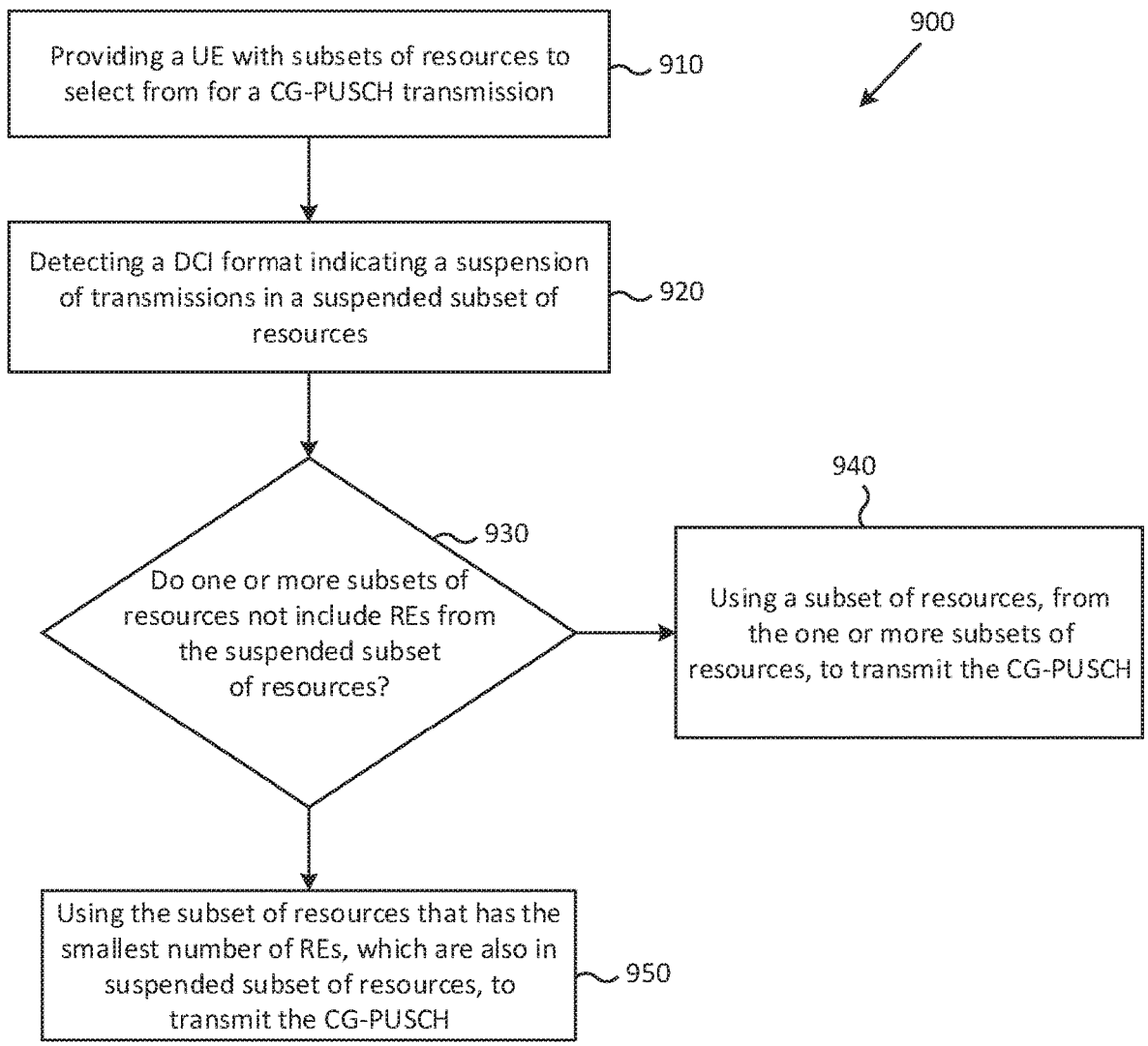
FIG. 9 illustrates a method of determining a resource for a configured grant physical uplink shared channel (CG-PUSCH) transmission according to various embodiments of the present disclosure.

For example, FIG. 9 illustrates a method 900 of determining a resource for a CG-PUSCH transmission according to various embodiments of the present disclosure. More particularly, FIG. 9 illustrates a method of determining a resource, from a set of multiple resources, for a CG-PUSCH transmission according to various embodiments of the present disclosure. Although described herein as being implemented by the UE 116, the method illustrated in FIG. 9 can be implemented by one or more of the UEs 111-116 and a corresponding method can be performed by one or more of the gNBs 101-103 described in FIG. 1. Other embodiments can be used without departing from the scope of the present disclosure.

In operation 910, a UE, such as the UE 116, is provided with a set of resources for a CG-PUSCH transmission. The UE 116 can be provided with the set of resources by a gNB, such as the gNB 102. The set of resources can be stored in the memory 360. In some embodiments, the set of resources are a set of time-frequency resources. The UE 116 uses one of the subsets of resources to transmit a CG-PUSCH.

In operation 920, the UE 116 detects a DCI format that indicates suspension or cancelation of transmissions in a subset of the set of resources. The suspended or cancelled resources are referred to herein as the suspended subset of resources. The subset of resources can be a set of time-frequency resources. In operation 930, the UE 116 determines whether one or more subsets of resources from the set of resources do not include REs from the suspended subset of resources. If the UE 116 determines one or more subsets of resources from the set of resources do not include REs from the suspended subset of resources, the UE 116 proceeds to operation 940. If the UE 116 determines that one or more subsets of resources from the set of resources include REs from the suspended subset of resources, the UE 116 proceeds to operation 950.

In operation 940, when there are one or more subsets of resources from the first set of resources that do not include REs from the suspended subset of resources, the transceiver 310 transmits the CG-PUSCH using a subset of resources from the one or more subsets of resources. For example, the subset can be the one with the smallest index or, if different subsets of resources are associated with different MCS, can be the one with the largest MCS.

In operation 950, when there is no subset of resources from the first set of resources that does not include REs from the suspended subset of resources, the transceiver 310 transmits the CG-PUSCH using a subset of resources from the set of resources that has the smallest number of REs that are also in the suspended subset of resources. In some embodiments, the UE 116 can puncture, or rate-match, the CG-PUSCH transmission in the REs of the subset of resources that are also in the suspended subset of resources. In other embodiments, when different subsets of resources from the set of resources are associated with different MCS, the subset of resources can be the one that results to the smallest MCS reduction after puncturing the CG-PUSCH transmission. In addition, as described in greater detail below, the UE 116 can increase a CG-PUSCH transmission power to account for the reduction in a number of REs for the CG-PUSCH transmission that results from the puncturing of the CG-PUSCH transmission in the REs of the subset of resources that are also in the suspended subset of resources, or to account for interference in the REs of the subset of resources that are also in the suspended subset of resources when the UE does not puncture the CG-PUSCH transmission in those REs.

In various embodiments, a gNB, such as the gNB 102, transmits a DCI format 2_4 based on whether or not previously configured or scheduled transmissions from UEs, such as one or more of the UEs 111-116, need to be suspended in a set of time-frequency resources indicated by the DCI format 2_4. The gNB can provide the set of time-frequency resources for a CORESET associated with a search space set for PDCCH transmission for the DCI format 2_4 to the UE 116. However, the UE 116 may not rate match or puncture a PDSCH reception according to the CORESET resources, when a PDSCH reception includes CORESET resources, because the CORESET resources may typically not be used by the gNB 102 to transmit a PDCCH with a DCI format 2_4. Therefore, a resource overhead that corresponds to an always present transmission of PDCCH with DCI format 24 can be avoided.

Instead, the UE 116 can assume that CORESET resources are available for PDSCH reception. When the CORESET resources are not available, the gNB 102 can later provide a corresponding indication to the UE 116. In some embodiments, the corresponding indication can be provided through a field in a DCI format scheduling PDSCH receptions to the UE 116, where for example the field can be applicable for a previous PDSCH transmission for a same TB as identified by the NDI field the RV field and the HARQ process number field in a DL DCI format. In other embodiments, the corresponding indication can be provided through a DCI format 2_1 that indicates resources with discontinuous transmission to the UE 116 in one or more previous slots. In various embodiments, the gNB 102 can configure the UE 116, through higher layer signaling, whether or not the UE rate matches or punctures a PDSCH reception around the CORESET resources.

In some embodiments, the UE 116 can rate match or puncture a PDSCH reception around CORESET resources that the UE 116 is provided, by higher layer signaling, for a search space set associated with a PDCCH reception for DCI format 2_4. In order to minimize corresponding resource overhead, the UE 116 assumes that resources associated with PDCCH candidates for DCI format 2_4 are unavailable in the CORESET and no other PDCCH is transmitted in the CORESET, unless the CORESET is within the first 3 symbols of a slot where other PDCCH transmissions can also occur. In addition, for a single PDCCH candidate such as first PDCCH candidate, the UE 116 can assume the single PDCCH candidate is received for DCI format 2_4 in the CORESET. It is also possible than when the CORESET is located within the first 3 symbols of a slot, the UE 116 can assume that any PDCCH candidate for DCI format 2_4 can be used to receive the PDCCH providing DCI format 2_4.

In some embodiments, the UE 116 monitors PDCCH for DCI format 2_4 in a particular slot regardless of whether or not the transceiver 310 transmits in the slot. When the UE 116 detects a DCI format 2_4 and the UE has a PDSCH reception in resources that include resources used for the PDCCH reception for DCI format 2_4, the UE 116 rate matches or punctures the PDSCH reception in the resources used for the PDCCH reception for DCI format 2_4; otherwise, the when the UE does not detect the DCI format 2_4, the UE does not rate match or puncture the PDSCH reception in the resources used for the PDCCH reception for DCI format 2_4.

Figure 10:
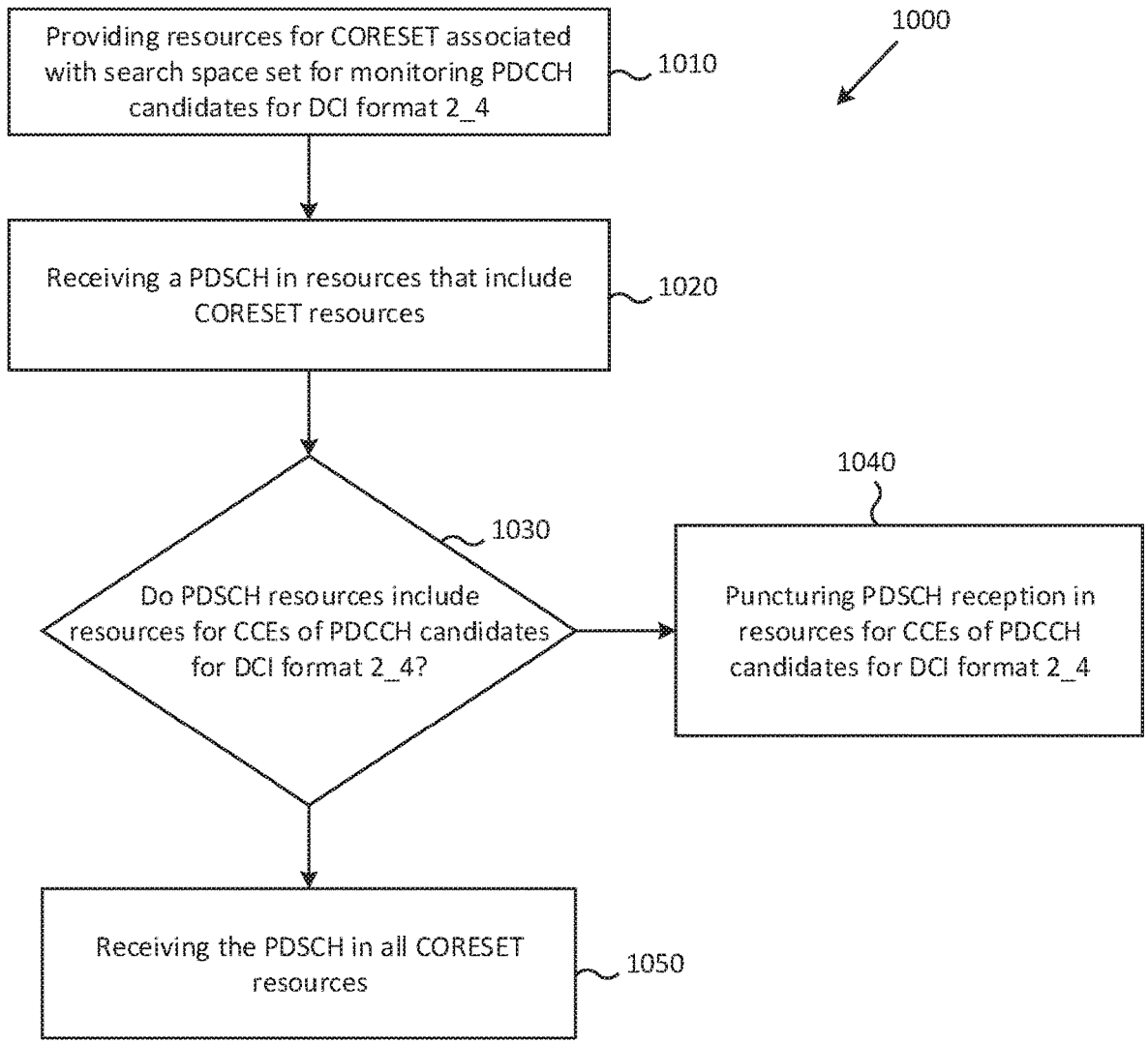
FIG. 10 illustrates a method of receiving a physical downlink shared channel (PDSCH) according to various embodiments of the present disclosure.

FIG. 10 illustrates a method 1000 of receiving a PDSCH according to various embodiments of the present disclosure. More particularly, FIG. 10 illustrates a method, performed by a UE, such as the UE 116, of receiving a PDSCH in resources that overlap with resource of a CORESET the UE 116 is configured for receiving PDCCH candidates for DCI format 2_4 according to various embodiments of the present disclosure. Although described herein as being implemented by the UE 116, the method illustrated in FIG. 10 can be implemented by one or more of the UEs 111-116 and a corresponding method can be performed by one or more of the gNBs 101-103 described in FIG. 1. Other embodiments can be used without departing from the scope of the present disclosure.

In operation 1010, a UE, such as the UE 116, is provided resources for a CORESET associated with a search space set for monitoring PDCCH candidates for DCI format 2_4. The UE 116 can be provided the resources by a gNB, such as the gNB 102. The resources can be stored in the memory 360. In some embodiments, the provided resources can be a set of time-frequency resources.

In operation 1020, the transceiver 310 receives a PDSCH in resources that include the CORESET resources. In some embodiments, the transceiver 310 receives the PDSCH from the gNB 102.

In operation 1030, the UE 116 determines whether the PDSCH resources include resources used for CCEs of PDCCH candidates for DCI format 2_4, such as a single PDCCH candidate. If the UE 116 determines the PDSCH resources do include resources used for CCEs of PDCCH candidates for DCI format 2_4, the UE 116 proceeds to operation 1040. If the UE 116 determines the PDSCH resources do not include resources used for CCEs of PDCCH candidates for DCI format 2_4, the UE 116 proceeds to operation 1050.

In operation 1040, based on the UE 116 determining the PDSCH resources do include resources used for CCEs of PDCCH candidates for DCI format 2_4, the UE 116 punctures the PDSCH reception in resources for CCEs of PDCCH candidates for DCI format 2_4. In operation 1050, based on the UE 116 determining the PDSCH resources do not include resources used for CCEs of PDCCH candidates for DCI format 2_4, the UE 116 receives the PDSCH in all CORESET resources.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A method for a user equipment (UE) to receive physical downlink control channels (PDCCHs) with a first sub-carrier spacing (SCS), the method comprising:

receiving a bitmap indicating symbols of a slot that are first symbols of control resource sets (CORESETs) for PDCCH receptions;

determining, based on the bitmap, a first number of symbols that is a smallest number of symbols in between:
- a first symbol of PDCCH receptions in first CORESETs, wherein the first CORESETs are within a second number of symbols, and
- a first symbol of PDCCH receptions in second CORESETs, wherein:
  - the second CORESETs are within the second number of symbols, and
  - the first number of symbols is larger than or equal to the second number of symbols;

determining, based on the first number of symbols and the first SCS, a first maximum number of non-overlapping control channel elements (CCEs) to perform channel estimation for PDCCH receptions in CORESETs within the second number of symbols, wherein the CCEs are non-overlapping when the CCEs:
- are in CORESETs with different indexes, or
- are in CORESETs located in different symbols; and receiving the PDCCHs with the first SCS according to the first maximum number of non-overlapping CCEs.

2. The method of claim 1, wherein the CCEs are also non-overlapping when the CCEs have different indexes in a same CORESET.

3. The method of claim 1, further comprising:
receiving PDCCHs with a second SCS according to a second maximum number of non-overlapping CCEs, wherein, when the first SCS and the second SCS are the same:
- the second maximum number of non-overlapping CCEs is larger than the first maximum number of non-overlapping CCEs, and
- the PDCCHs with the second SCS are received over a larger number of symbols than the first number of symbols.

4. The method of claim 3, wherein:
the first SCS is smaller than or equal to a predetermined value, and
the second SCS is either smaller than or equal to the predetermined value or larger than the predetermined value.

5. The method of claim 1, wherein:
the first maximum number of non-overlapping CCEs has a first value or a second value when the first number of symbols has a third value or a fourth value, respectively, and
the first value is larger than the second value when the third value is larger than the fourth value.

6. The method of claim 1, wherein:
a PDCCH includes a downlink control information (DCI) format,
the DCI format is one of DCI format 0_0, DCI format 0_1, DCI format 0_2, DCI format 1_0, DCI format 1_1, and DCI format 1_2,
a maximum size of the DCI format 0_0 is smaller than a maximum size of the DCI format 0_1,
a maximum size of the DCI format 1_0 is smaller than a maximum size of the DCI format 1_1,
a minimum size of the DCI format 0_2 is smaller than a minimum size of the DCI format 0_0,
a minimum size of the DCI format 1_2 is smaller than a minimum size of the DCI format 1_0,
a total number of sizes for the DCI format 0_0, the DCI format 0_1, the DCI format 0_2, the DCI format 1_0, the DCI format 1_1, and the DCI format 1_2 is larger than a predetermined number,
a size of the DCI format 0_0 and a size of the DCI format 1_0 are aligned by appending padding bits to a smaller of the size of the DCI format 0_0 and the size of the DCI format 1_0, and
a size of the DCI format 0_2 and a size of the DCI format 12 are aligned by adding padding bits to a smaller of the size of the DCI format 0_2 and the size of the DCI format 1_2 when, after aligning the size of the DCI format 0_0 and the size of the DCI format 1_0, the total number of sizes for the DCI format 0_0, the DCI format 0_1, the DCI format 0_2, the DCI format 1_0, the DCI format 1_1, and the DCI format 1_2 is larger than the predetermined number.

7. The method of claim 6, wherein a size of the DCI format 0_1 and a size of the DCI format 1_1 are aligned by adding padding bits to a smaller of the size of the DCI format 0_1 and the size of the DCI format 1_1 when, after aligning the size of the DCI format 0_0 and the size of the DCI format 1_0 and after aligning the size of the DCI format 0_2 and the size of the DCI format 1_2, the total number of sizes for the DCI format 0_0, the DCI format 0_1, the DCI format 0_2, the DCI format 1_0, the DCI format 1_1, and the DCI format 12 is larger than the predetermined number.

8. A user equipment (UE) comprising:
a receiver configured to receive a bitmap indicating symbols of a slot that are first symbols of control resource sets (CORESETs) for receptions of physical downlink control channels (PDCCHs) with a first subcarrier spacing (SCS); and
a processor configured to determine:
based on the bitmap, a first number of symbols that is a smallest number of symbols in between:
- a first symbol of PDCCH receptions in first CORESETs, wherein the first CORESETs are within a second number of symbols, and
- a first symbol of PDCCH receptions in second CORESETs that are within the second number of symbols, wherein:
  - the second CORESETs are within the second number of symbols, and
  - the first number of symbols is larger than or equal to the second number of symbols; and
based on the first number of symbols and the first SCS, a first maximum number of non-overlapping control channel elements (CCEs) for PDCCH receptions in CORESETs within the second number of symbols, wherein the CCEs are non-overlapping when the CCEs:
- are in CORESETs with different indexes, or
- are in CORESETs located in different symbols,
wherein the receiver is further configured to receive the PDCCHs with the first SCS according to the first maximum number of non-overlapping CCEs.

9. The UE of claim 8, wherein the CCEs are also non-overlapping when the CCEs have different indexes in a same CORESET.

10. The UE of claim 8, wherein:
the receiver is further configured to receive PDCCHs with a second SCS according to a second maximum number of non-overlapping CCEs, wherein, when the first SCS and the second SCS are the same:

the second maximum number of non-overlapping CCEs is larger than the first maximum number of non-overlapping CCEs, and the PDCCHs with the second SCS are received over a larger number of symbols than the first number of symbols.

11. The UE of claim 10, wherein:

the first SCS is smaller than or equal to a predetermined value, and the second SCS is either smaller than or equal to the predetermined value or larger than the predetermined value.

12. The UE of claim 8, wherein:

the first maximum number of non-overlapping CCEs has a first value or a second value when the first number of symbols has a third value or a fourth value, respectively, and the first value is larger than the second value when the third value is larger than the fourth value.

13. The UE of claim 8, wherein:

a PDCCH includes a downlink control information (DCI) format, the DCI format is one of DCI format 0_0, DCI format 0_1, DCI format 0_2, DCI format 1_0, DCI format 1_1, and DCI format 1_2, a maximum size of the DCI format 0_0 is smaller than a maximum size of the DCI format 0_1, a maximum size of the DCI format 1_0 is smaller than a maximum size of the DCI format 1_1, a minimum size of the DCI format 0_2 is smaller than a minimum size of the DCI format 0_0, a minimum size of the DCI format 1_2 is smaller than a minimum size of the DCI format 1_0, a total number of sizes for the DCI format 0_0, the DCI format 0_1, the DCI format 0_2, the DCI format 1_0, the DCI format 1_1, and the DCI format 1_2 is larger than a predetermined number, a size of the DCI format 0_0 and a size of the DCI format 1_0 are aligned by appending padding bits to a smaller of the size of the DCI format 0_0 and the size of the DCI format 1_0, and a size of the DCI format 0_2 and a size of the DCI format 1_2 are aligned by adding padding bits to a smaller of the size of the DCI format 0_2 and the size of the DCI format 1_2 when, after aligning the size of the DCI format 0_0 and the size of the DCI format 1_0, the total number of sizes for the DCI format 0_0, the DCI format 0_1, the DCI format 0_2, the DCI format 1_0, the DCI format 1_1, and the DCI format 1_2 is larger than the predetermined number.

14. The UE of claim 13, wherein a size of the DCI format 0_1 and a size of the DCI format 1_1 are aligned by adding padding bits to a smaller of the size of the DCI format 0_1 and the size of the DCI format 1_1 when, after aligning the size of the DCI format 0_0 and the size of the DCI format 1_0 and after aligning the size of the DCI format 0_2 and the size of the DCI format 1_2, the total number of sizes for the DCI format 0_0, the DCI format 0_1, the DCI format 0_2, the DCI format 1_0, the DCI format 1_1, and the DCI format 1_2 is larger than the predetermined number.

15. A base station comprising:

a transmitter configured to transmit a bitmap indicating symbols of a slot that are first symbols of control resource sets (CORESETs) for transmissions of physical downlink control channels (PDCCHs) with a first sub-carrier spacing (SCS); and a processor configured to determine:

based on the bitmap, a first number of symbols that is a smallest number of symbols in between:

a first symbol of PDCCH transmissions in first CORESETs, wherein the first CORESETs are within a second number of symbols, and a first symbol of PDCCH transmissions in second CORESETs that are within the second number of symbols, wherein:

the second CORESETs are within the second number of symbols, and the first number of symbols is larger than or equal to the second number of symbols; and based on the first number of symbols and the first SCS, a first maximum number of non-overlapping control channel elements (CCEs) for PDCCH transmissions in CORESETs within the second number of symbols, wherein the CCEs are non-overlapping when the CCEs:

are in CORESETs with different indexes, or are in CORESETs located in different symbols, wherein the transmitter is further configured to transmit the PDCCHs with the first SCS.

16. The base station of claim 15, wherein the CCEs are also non-overlapping when the CCEs have different indexes in a same CORESET.

17. The base station of claim 15, wherein:

the transmitter is further configured to transmit PDCCHs with a second SCS according to a second maximum number of non-overlapping CCEs, wherein, when the first SCS and the second SCS are the same:

the second maximum number of non-overlapping CCEs is larger than the first maximum number of non-overlapping CCEs, and the transmitter transmits the PDCCHs with the second SCS over a larger number of symbols than the first number of symbols.

18. The base station of claim 17, wherein:

the first SCS is smaller than or equal to a predetermined value, and the second SCS is either smaller than or equal to the predetermined value or larger than the predetermined value.

19. The base station of claim 15, wherein:

a PDCCH includes a downlink control information (DCI) format, the DCI format is one of DCI format 0_0, DCI format 0_1, DCI format 0_2, DCI format 1_0, DCI format 1_1, and DCI format 1_2, a maximum size of the DCI format 0_0 is smaller than a maximum size of the DCI format 0_1, a maximum size of the DCI format 1_0 is smaller than a maximum size of the DCI format 1_1, a minimum size of the DCI format 0_2 is smaller than a minimum size of the DCI format 0_0, a minimum size of the DCI format 1_2 is smaller than a minimum size of the DCI format 1_0, a total number of sizes for the DCI format 0_0, the DCI format 0_1, the DCI format 0_2, the DCI format 1_0, the DCI format 1_1, and the DCI format 1_2 is larger than a predetermined number, a size of the DCI format 0_0 and a size of the DCI format 1_0 are aligned by appending padding bits to a smaller of the size of the DCI format 0_0 and the size of the DCI format 1_0, and a size of the DCI format 0_2 and a size of the DCI format 1_2 are aligned by adding padding bits to a smaller of the size of the DCI format 0_2 and the size of the DCI format 1_2 when, after aligning the size of the DCI format 0_0 and the size of the DCI format 1_0, the total number of sizes for the DCI format 0_0, the DCI format 0_1, DCI format 0_2, the DCI format 1_0, the DCI format 1_1, and the DCI format 1_2 is larger than the predetermined number.

20. The base station of claim 19, wherein a size of the DCI format 0_1 and a size of the DCI format 1_1 are aligned by adding padding bits to a smaller of the size of the DCI format 0_1 and the size of the DCI format 1_1 when, after aligning the size of the DCI format 0_0 and the size of the DCI format 1_0 and after aligning the size of the DCI format 0_2 and the size of the DCI format 1_2, the total number of sizes for the DCI format 0_0, the DCI format 0_1, the DCI format 0_2, the DCI format 1_0, the DCI format 1_1, and the DCI format 1_2 is larger than the predetermined number.

* * * * *